United States Patent
Murakami

(10) Patent No.: US 12,546,246 B2
(45) Date of Patent: Feb. 10, 2026

(54) VALVE BODY, FLOW PATH SWITCHING VALVE, AND HEAT MEDIUM SYSTEM FOR AUTOMOBILE

(71) Applicant: Hitachi Astemo, Ltd., Hitachinaka (JP)

(72) Inventor: Shingo Murakami, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/689,713

(22) PCT Filed: Jul. 11, 2022

(86) PCT No.: PCT/JP2022/027202
§ 371 (c)(1),
(2) Date: Mar. 6, 2024

(87) PCT Pub. No.: WO2023/037752
PCT Pub. Date: Mar. 16, 2023

(65) Prior Publication Data
US 2024/0384677 A1 Nov. 21, 2024

(30) Foreign Application Priority Data
Sep. 8, 2021 (JP) .............................. 2021-146322

(51) Int. Cl.
*F01P 5/10* (2006.01)
*F01P 3/20* (2006.01)
(Continued)

(52) U.S. Cl.
CPC .................. *F01P 7/14* (2013.01); *F01P 3/20* (2013.01); *F01P 5/10* (2013.01); *F16K 11/085* (2013.01);
(Continued)

(58) Field of Classification Search
CPC ........ F01P 2007/146; F01P 7/14; F01P 7/165; F16K 11/0876
(Continued)

(56) References Cited

U.S. PATENT DOCUMENTS 10,280,829 B2 * 5/2019 Shen ...................... F01P 7/165
10,808,856 B2 * 10/2020 Shen ......................... F01P 3/20
(Continued)

FOREIGN PATENT DOCUMENTS

| JP | 56-154010 U | 11/1981 |
| JP | 2018-066402 A | 4/2018 |
| JP | 2019-184075 A | 10/2019 |

OTHER PUBLICATIONS

International Search Report dated Sep. 27, 2022 issued in International Application No. PCT/JP2022/027202, with English translation, 5 pages.
(Continued)

*Primary Examiner* — Hung Q Nguyen
*Assistant Examiner* — James J Kim
(74) *Attorney, Agent, or Firm* — FOLEY & LARDNER LLP

(57) ABSTRACT

Provided is a valve body that changes a communication state of a flow path through which liquid flows, the valve body comprising a valve main body formed of synthetic resin and comprising inside a press-fit fixing cylinder made of metal, and a drive shaft that is press-fitted in and fixed to the press-fit fixing cylinder of the valve main body. A non-press-fit portion comprising a space in a predetermined shape is formed in either one of the press-fit fixing cylinder and the drive shaft or both the press-fit fixing cylinder and the drive shaft. If the press-fit fixing cylinder is deformed to be expanded due to the press-fitting of the drive shaft, the deformation can be absorbed by the non-press-fit portion.

(Continued)

This makes it possible to restrain a split or crack from being generated in the synthetic resin that forms the valve main body which is located around the press-fit fixing cylinder in which the drive shaft is press-fitted.

11 Claims, 14 Drawing Sheets

(51) Int. Cl.
    *F01P 7/14*         (2006.01)
    *F16K 11/085*     (2006.01)

(52) U.S. Cl.
    CPC ..... *F01P 2007/146* (2013.01); *F01P 2060/04* (2013.01)

(58) Field of Classification Search
    USPC ...................................................... 123/41.44
    See application file for complete search history.

(56) References Cited

U.S. PATENT DOCUMENTS

| | | | |
|---|---|---|---|
| 11,378,189 B2* | 7/2022 | Shen | F16K 31/535 |
| 2013/0087730 A1* | 4/2013 | Seko | F16K 1/32 |
| | | | 251/318 |
| 2016/0010536 A1* | 1/2016 | Murakami | F16K 11/076 |
| | | | 137/625.44 |
| 2018/0051815 A1* | 2/2018 | Murakami | F01P 7/14 |
| 2018/0149073 A1 | 5/2018 | Shen et al. | |
| 2021/0080014 A1* | 3/2021 | Sato | F16K 11/0876 |
| 2021/0387489 A1* | 12/2021 | Sugino | F16K 15/20 |

OTHER PUBLICATIONS

Written Opinion dated Sep. 27, 2022 issued in International Application No. PCT/JP2022/027202, with English translation, 10 pages.

* cited by examiner

VALVE BODY, FLOW PATH SWITCHING VALVE, AND HEAT MEDIUM SYSTEM FOR AUTOMOBILE

TECHNICAL FIELD

The invention relates to valve bodies provided in liquid flow paths, flow path switching valves using the valve bodies, and heat medium systems using the flow path switching valves, and more specifically relates to, for example, valve bodies used to distribute cooling water for cooling heat sources, such as internal combustion engines and lithium batteries, to various kinds of heat auxiliary devices, flow path switching valves using the valve bodies, and heat medium systems for automobiles which use the flow path switching valves.

BACKGROUND ART

A generic automobile uses a flow path switching valve to distribute cooling water to various kinds of heat auxiliary devices for the purpose of circulating the cooling water in a radiator to externally release the heat of the cooling water for cooling an internal combustion engine or circulating a high-temperature cooling water in heating apparatus to warm up the vehicle interior.

Such a flow path switching valve that is used to distribute cooling water for cooling an automobile internal combustion engine is described, for example, in Japanese Unexamined Patent Application Publication (Kokai) No. 2018-66402 (Patent Literature 1). The flow path switching valve described in Patent Literature 1 is a rotary flow path switching valve in which a bottomed cylinder-like valve body comprising a closing wall on one side and an open portion on the other is rotatably housed in a housing body. The rotary flow path switching valve switches flow paths in accordance with the rotational position of the valve body. The flow path switching valve is configured to be opened by coincidence of an opening portion of a communication path which is formed in the housing body and an opening portion formed at an outer peripheral portion of a valve main body, and distribute the cooling water that enters from an inlet that is an open end of the valve main body to the opening portion of the valve main body and further distribute to various kinds of heat auxiliary devices of the automobile through the communication path of the housing body.

CITATION LIST

Patent Literature

PTL 1: Japanese Unexamined Patent Application Publication (Kokai) No. 2018-66402

SUMMARY OF INVENTION

Technical Problem

According to the valve body used in a flow path switching valve as illustrated in FIGS. 10 and 11 of Patent Literature 1, a metal-formed drive shaft is press-fitted in and integrated with a synthetic resin-formed valve main body. In such a configuration where the metal drive shaft is press-fitted directly in the synthetic resin valve main body, however, it is difficult to obtain a sufficient fixing force between the drive shaft and the valve main body.

To solve this problem, a metal press-fit fixing cylinder (metal insert) is integrally insert-molded in a synthetic resin valve main body, and a metal drive shaft is press-fitted in the entire length of the press-fit fixing cylinder for firm fixation between the drive shaft and the valve main body. A retainer or the like is formed at an outer periphery of the press-fit fixing cylinder to prevent the press-fit fixing cylinder from falling off of the valve main body.

When the metal drive shaft is press-fitted in the metal press-fit fixing cylinder, the press-fit fixing cylinder is outwardly pressed and enlarged in an outer circumferential direction due to the movement of the drive shaft during the press-fitting process. Since the metal press-fit fixing cylinder is thus deformed to expand, the deformation needs to be absorbed by the synthetic resin valve main body. The synthetic resin forming the valve main body, however, cannot be expected much to absorb the deformation of the press-fit fixing cylinder.

Consequently, there has been the problem that the synthetic resin on the outer side of the press-fit fixing cylinder is cracked or split, which causes a poor yield as a product. The splitting and cracking is prone to occur especially in a strength-decreased region (for example, a welded portion, a void portion, and a gas-deposited portion) which is created by the mold forming in the case of the integral molding of the press-fit fixing cylinder.

An object of the invention is to provide a valve body in which splitting or cracking is restrained from being generated in synthetic resin that forms a valve main body in the vicinity of a press-fit fixing cylinder in which a drive shaft is press-fitted; a flow path switching valve using the valve body; and a heat medium system for an automobile which uses the flow path switching valve.

Solution to Problem

A main feature of the invention is a valve body that changes a communication state of a flow path through which liquid flows, the valve body comprising a valve main body that is formed of synthetic resin and comprises inside a press-fit fixing cylinder made of metal, and a drive shaft that is press-fitted in and fixed to the press-fit fixing cylinder of the valve main body, wherein a non-press-fit portion comprising a space in a predetermined shape is formed in either one of the press-fit fixing cylinder and the drive shaft or both the press-fit fixing cylinder and the drive shaft.

One embodiment of the invention makes it possible to provide the valve body in which splitting or cracking is restrained from being generated in synthetic resin that forms a valve main body near a press-fit fixing cylinder, in which a drive shaft is press-fitted, and further provide a flow path switching valve using the valve body.

DESCRIPTION OF EMBODIMENTS

Embodiments of the invention will be described below in details with reference to the drawings. The invention is not limited to the following embodiments and includes various modification examples and applications in the scope of technical concepts of the invention.

Prior to the description of embodiments of the invention, a configuration of a flow path switching valve to which the invention is applied will be described with reference to FIGS. 1 to 9. The following description, as mentioned above, refers to, as an example, a situation where cooling water in an internal combustion engine is used as a heat medium. According to the invention, however, the heat medium does not necessarily have to be cooling water in the internal combustion engine. The invention is also applicable to a heat medium for cooling a heat source, such as a lithium battery.

Figure 1:
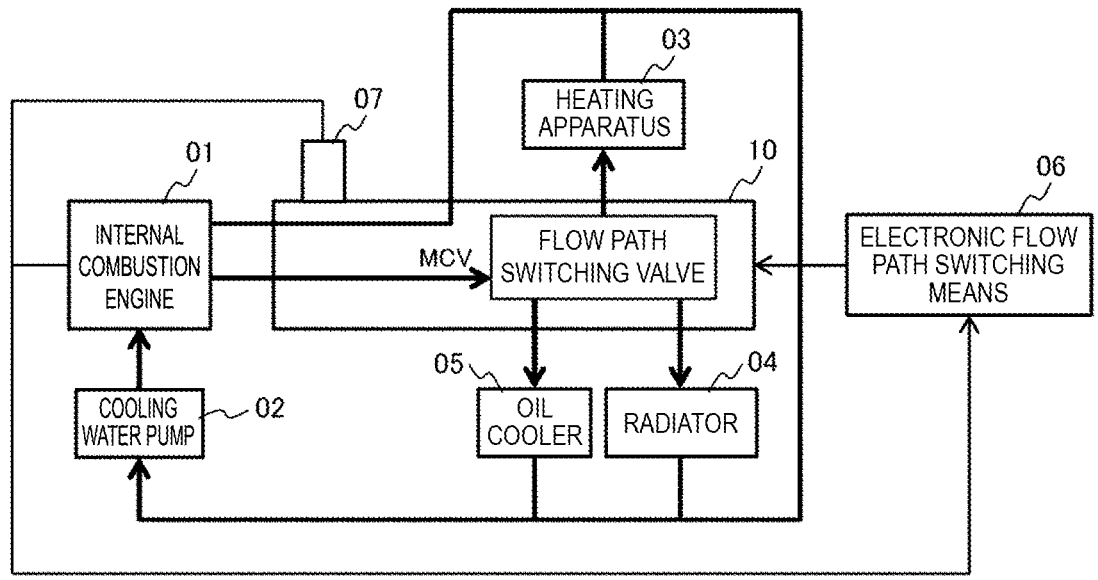
FIG. 1 is a configuration diagram of a heat medium system for an automobile as an example to which a flow path switching valve of the invention is applied.

Referring to FIG. 1, a cylinder jacket of an internal combustion engine 01 is supplied with cooling water from a cooling water pump 02. After cooling the cylinder jacket, the cooling water is sent to a flow path switching valve 10 and partially returned through a thermostat to a suction side of the cooling water pump 02 for constant circulation. The rest of the cooling water is sent to heat auxiliary devices including a heating apparatus 03, a radiator 04, and an oil cooler 05. The heat auxiliary devices are illustrated as examples, and other heat auxiliary devices may be utilized instead.

Cooling water distribution to the heat auxiliary devices is controlled by electronic flow path switching means 06. For example, water temperature information from a water temperature sensor 07 provided in the flow path switching valve 10, driving state information of the internal combustion engine 01, and operation state information of various kinds operation devices located in a vehicle interior are inputted in the electronic flow path switching means 06. Flow paths leading to the heat auxiliary devices are switched from one another in accordance with a control signal that is computed by the electronic flow path switching means 06.

As mentioned later, an electric motor is built in the flow path switching valve 10. Rotation of the electric motor is controlled by the control signal transmitted from the electronic flow path switching means 06. A valve main body is fixed to the electronic motor. The valve main body is rotated to cause cooling water to flow into communication paths which are formed in the flow path switching valve 10 and connected to the heat auxiliary devices. The cooling water is accordingly distributed from the internal combustion engine to the heat auxiliary devices.

Figure 2:
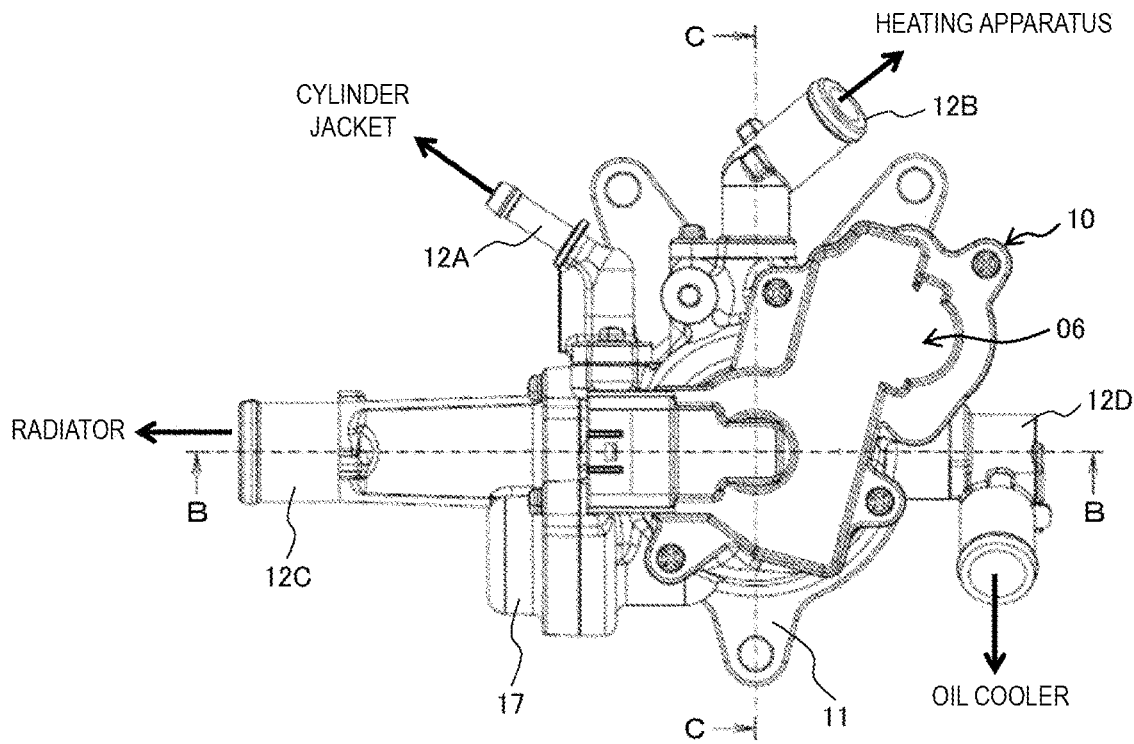
FIG. 2 is a top view of a flow path switching valve to which the invention is applied.

FIG. 2 illustrates an outer appearance of the flow path switching valve 10. The housing body 11 is provided with a connection pipe 12A that is linked to the cylinder jacket, a connection pipe 12B that is linked to the heating apparatus 03, a connection pipe 12C that is linked to the radiator 04, and a connection pipe 12D that is linked to the oil cooler 05. The cooling water flows out of the internal combustion engine 01 and enters the flow path switching valve 10. The cooling water is distributed to the connection pipes 12A to 12D by the valve main body provided in the interior portion of the housing body 11.

The flow path switching valve 10 is provided with a cover 17 that covers the thermostat in which wax is sealingly contained. The flow path switching valve 10 controls the cooling water flowing through the connection pipe 12A according to temperature. The electronic flow path switching means 06 is fixed to a top portion of the housing body 11 of the flow path switching valve 10 and controls the electric motor that is housed in the interior portion of the housing body 11.

Figure 3:
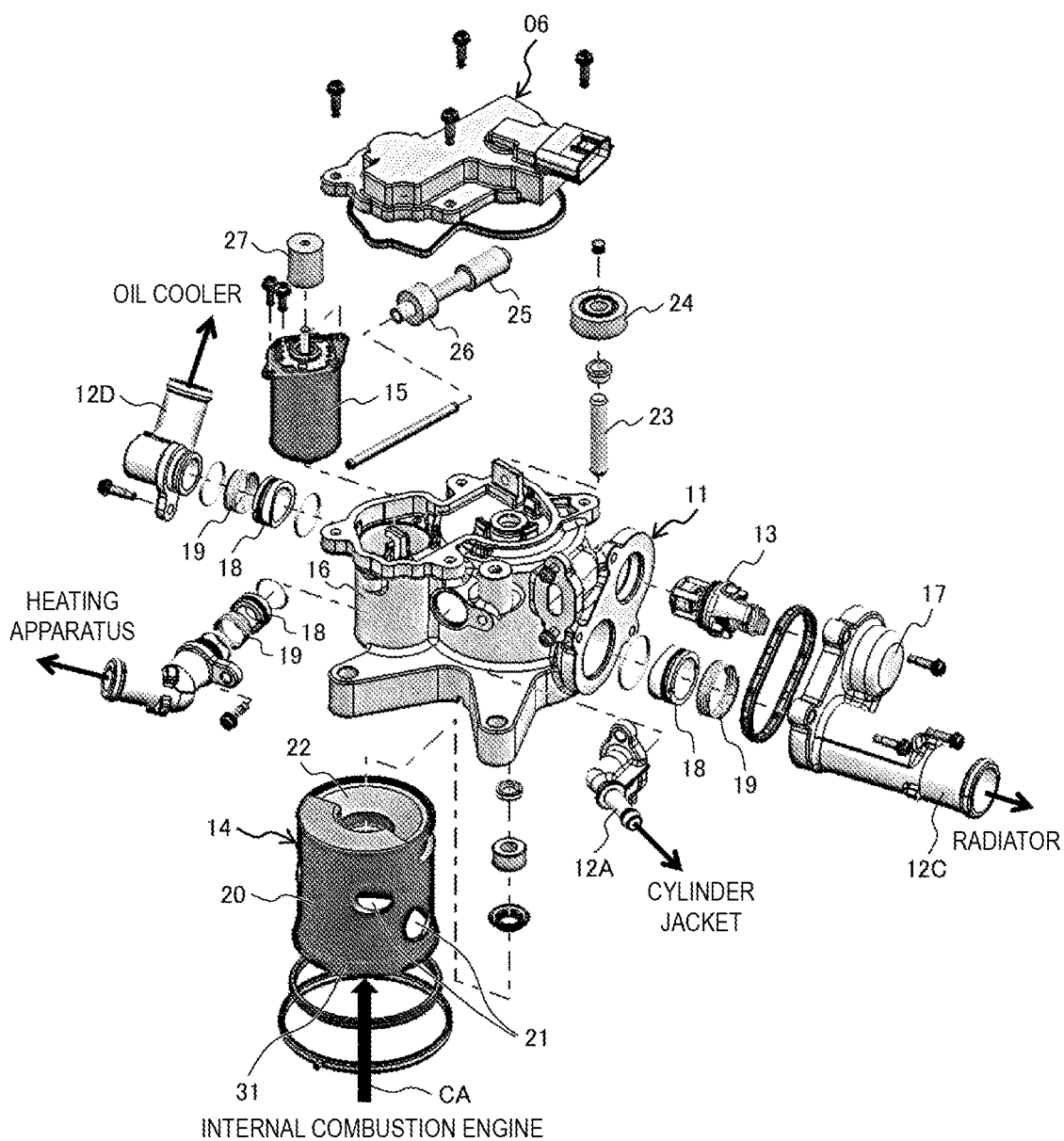
FIG. 3 is an exploded perspective view of the flow path switching valve illustrated in FIG. 2.

FIG. 3 illustrates a configuration of the flow path switching valve 10 of FIG. 2 which is exploded and seen in an oblique direction.

Formed in the housing body 11 are a valve housing portion (see FIGS. 6 and 7 and the like) in which a valve main body 14 having a hollow cylinder-like shape is housed and a motor housing portion 16 in which the electric motor 15 is housed. The electronic flow path switching means 06 is fixed to the housing body 11 from outside with fixing bolts, so that the electronic flow path switching means 06 and the housing body 11 are configured into a so-called mechanical and electrical integration type.

Attached to a periphery of the housing body 11 are the connection pipe 12A that is linked to the cylinder jacket, the connection pipe 12B that is linked to the heating apparatus 03, the connection pipe 12C that is linked to the radiator 04, and the connection pipe 12D that is linked to the oil cooler 05. The cover 17 that covers the thermostat 13 is integrally formed in the connection pipe 12C. A seal member 18 and a compression spring 19 are disposed between the housing body 11 and each of the connection pipes 12B to 12D. The seal member 18 is formed to have a shape like a circular cylinder with open ends. The seal member 18 is pressed to come into contact with an outer peripheral portion 20 of the valve main body 14 at a distal end surface thereof by the compression spring 19.

The valve main body 14 is formed of synthetic resin that is formed into a bottomed cylinder-like shape. Opening portions 21 are formed in the outer peripheral portion 20 of the valve main body 14 and connected to the connection pipes 12A to 12D. Accordingly, the cooling water shown by arrow CA which is pressure-fed from the cooling water pump 02 and flows from the internal combustion engine is discharged through the opening portions 21 into the connection pipes 12A to 12D.

A closing wall 22 is provided at one side of the valve main body 14. The closing wall 22 is fixed to a drive shaft 23 and rotated in synchronization with rotation of the drive shaft 23 within the valve housing portion of the housing body 11. In synchronization with the rotation of the closing wall 22, the valve main body 14 selects connection relations with the connection pipes 12A to 12D (switches flow paths). The opening portion 21 is capable of controlling an overlapping degree with respect to an opening of the seal member 18 according to a rotation state of the valve main body 14, and is therefore operated to control a flow rate in some cases.

The electric motor 15 and the valve main body 14 are coupled together by a worm gear mechanism. More specifically, a worm wheel 24 is fixed to an end portion of the drive shaft 23 which is on an opposite side from an end portion of the drive shaft 23, to which the valve main body 14 is fixed. The worm wheel 24 is meshed with a worm 25 that is formed at one side of a worm shaft. A worm wheel 26 that is formed on the other side of the worm shaft is meshed with a worm 27 fixed to the electric motor 15. When the electric motor 15 is rotated, therefore, the rotation is transmitted to the drive shaft 23 through the worm 27, the worm wheel 26, the worm 25, and the worm wheel 24 in the order mentioned, to thereby rotate the valve main body 14 in the end.

A cover provided with the electronic flow path switching means 06 is fixed to the housing body 11 so as to cover the electric motor 15 and the worm gear mechanism. A control signal transmitted from the electronic flow path switching means 06 is imparted to the electric motor 15 so that the electric motor 15 makes a predetermined rotational action.

Figure 4:
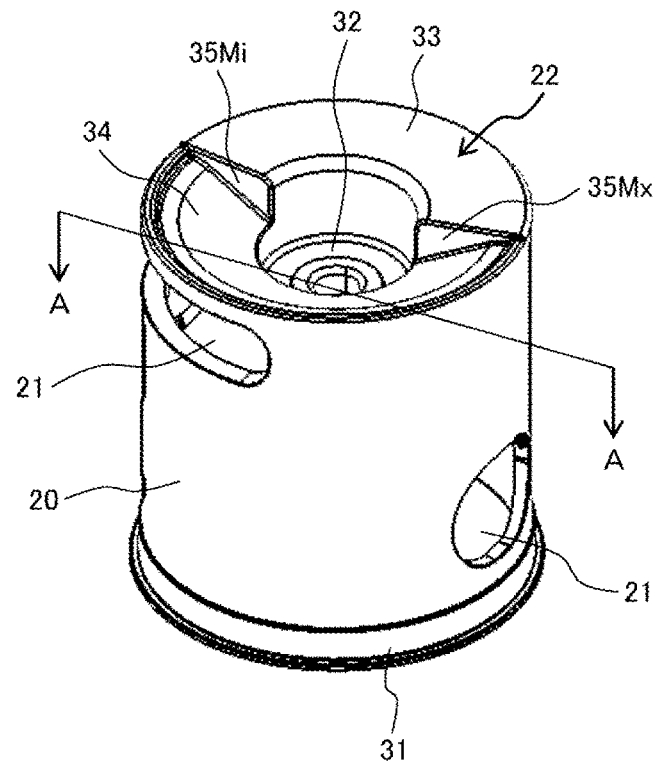
FIG. 4 is a perspective whole view of a valve main body to which the invention is applied.
Figure 5:
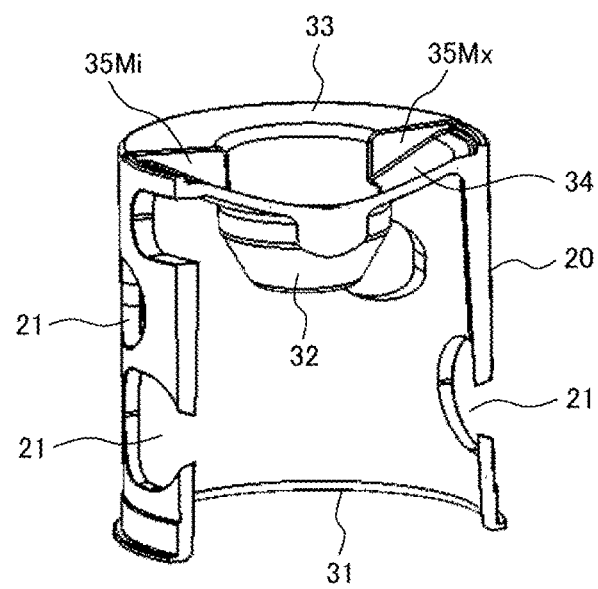
FIG. 5 is a cross-sectional view of the valve main body illustrated in FIG. 4, along an axial line A-A.

FIGS. 4 and 5 illustrate the configuration of the valve main body 14. The valve main body 14 is formed entirely of synthetic resin by mold forming. The valve main body 14 is formed into a shape like a bottomed cylinder in which the closing wall 22 is formed at one side, and an open portion 31 is formed at the other. A plurality of opening portions 21 are formed in the circular outer peripheral portion of the valve main body 14. The plurality of opening portions 21 are selectively connected to the connection pipes 12A to 12D and allow the cooling water entering the outer peripheral portion 20 from the open portion 31 to flow out into the connection pipes 12A to 12D. Connection states between the opening portions 21 formed in the outer peripheral portion 20 on one hand and the connection pipes 12A to 12D on the other are so selected that the opening portions 21 and the connection pipes 12A to 12D are properly paired according to the heat auxiliary devices connected to the connection pipes 12A to 12D.

The closing wall 22 includes a circular drive shaft fixing portion 32 formed about a center thereof. The drive shaft fixing portion 32 is projecting inside the outer peripheral portion 20 in an axial direction. The drive shaft 23 illustrated in FIG. 3 is fixed to the drive shaft fixing portion 32. Embedded in the drive shaft fixing portion 32 is an insert-molded press-fit fixing cylinder (see FIG. 8) which is made of metal. The drive shaft 23 is press-fitted in the press-fit fixing cylinder, whereby the valve main body 14 and the drive shaft 23 are integrated together (this configuration will be described later with reference to FIG. 8). Accordingly, the rotation of the electric motor 15 is decreased in velocity or increased in power through the worm gear mechanism and imparted to the drive shaft 23, to thereby rotate the valve main body 14 as well.

The closing wall 22 around the drive shaft fixing portion 32 is divided into two regions which include a flat region portion 33 that is a first region portion and a sloping region portion 34 that is a second region portion. The sloping region portion 34 is formed to extend from an outer peripheral edge of the closing wall 22 toward the drive shaft fixing portion 32 which is located on an axis of the valve main body 14 at a predetermined angle into a shape slanting toward the open portion 31 of the valve main body 14. The flat region portion 33 is formed to have a flat shape that is orthogonal to the axial direction along a radial direction of the valve main body 14.

As such, there are steps formed between the flat region portion 33 and the sloping region portion 34. Formed in the step portions along the axial direction are a first regulation wall 35Mi and a second regulation wall 35Mx. The first and second regulation walls 35Mi and 35Mx are each formed into a substantially right-angled triangle as viewed in the axial direction and function as regulated portions. The first regulation wall 35Mi and the second regulation wall 35Mx are radially formed in a radial manner and have such a shape as to have surface contact with a first regulation piece 39Mi and a second regulation piece 39Mx, both discussed later.

The first regulation wall 35Mi and the second regulation wall 35Mx inwardly extend from the flat region portion 33 toward the open portion 31 side in the axial direction of the valve main body 14, and therefore do not affect the size of an internal shape of a valve housing portion 28.

The first regulation wall 35Mi functions to determine a first regulation position that is an initial rotational position in consort with a first regulation portion discussed later. The second regulation wall 35Mx functions to determine a second regulation position that is a maximum rotational position in consort with a second regulation portion discussed later. The regulation positions may be located to make any angle with each other, but determined to be located so that the flat region portion 33 spreads at an angle of about 170 degrees.

Although the sloping region portion 34 is formed, the sloping region portion 34 may be formed into a flat region portion as long as there are steps that differ in level from the flat region portion 33 mentioned above, and the first regulation wall 35Mi and the second regulation wall 35Mx are formed in the step portions. The sloping region portion 34 enables the cooling water to easily flow toward a communication path 29 that is formed in the housing body 11.

A configuration of the valve housing portion 28 in which the valve main body 14 is housed will be described below with reference to FIGS. 6 and 7.

Figure 6:
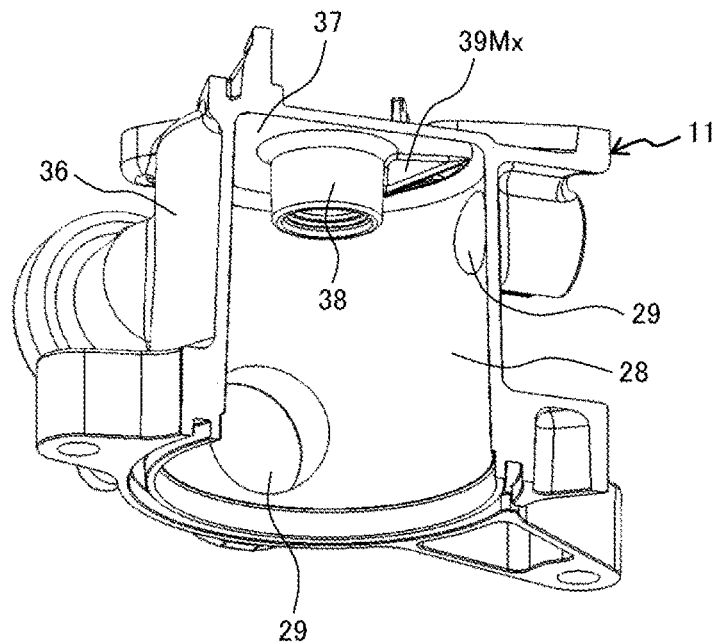
FIG. 6 is a perspective sectional view of a housing body of the flow path switching valve, partially taken away.
Figure 7:
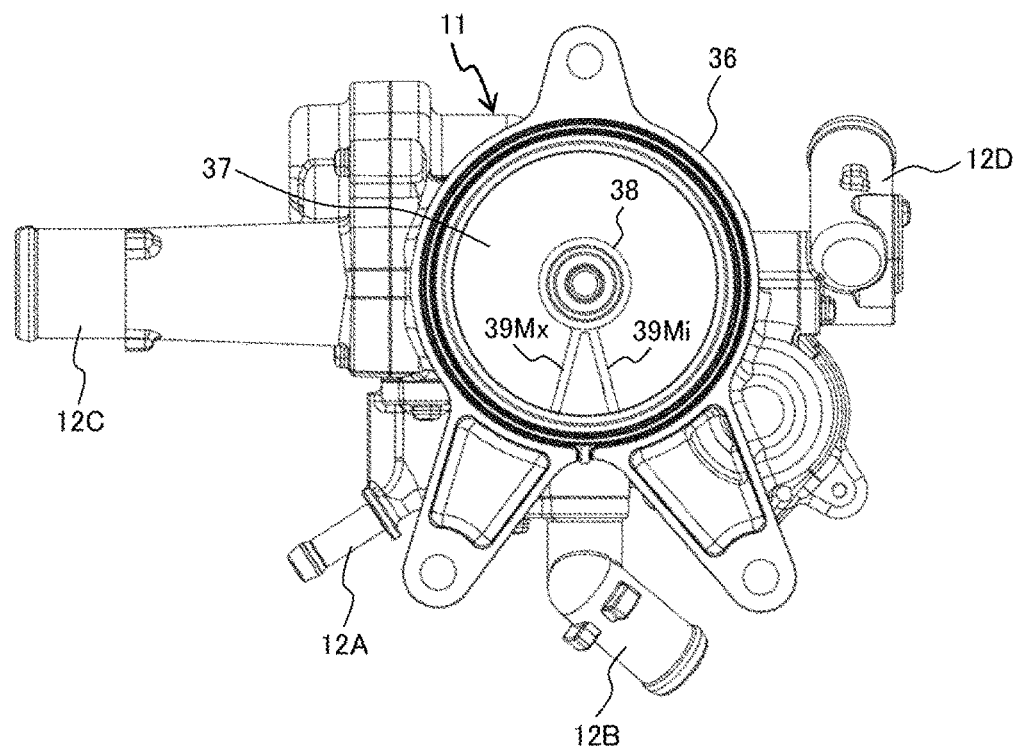
FIG. 7 is a bottom view of the flow path switching valve illustrated in FIG. 2.

In FIGS. 6 and 7, the valve housing portion 28 is formed in the housing body 11. The valve housing portion 28 has a circular shape in section which is orthogonal at a right angle to the axial direction. The valve housing portion 28 comprises a cylindrical lateral surface wall 36 and an end surface wall 37 that closes one side of the lateral surface wall 36. An opposite side to the end surface wall 37 is an open end. In a state where the valve main body 14 is housed in the valve housing portion 28, the closing wall 22 side of the valve main body 14 faces the end surface wall 37 of the valve housing portion 28.

A bearing fixing portion 38 is formed in the end surface wall 37 to be located around a center of the end surface wall 37. The bearing fixing portion 38 axially extends into the valve housing portion 28. The drive shaft 23 illustrated in FIG. 3 is rotatably supported by the bearing fixing portion 38. The first regulation piece 39Mi and the second regulation piece 39Mx which function as regulating portions are formed integrally with the end surface wall 37. The first regulation piece 39Mi and the second regulation piece 39Mx extend axially and inwardly from the end surface wall 37 to a predetermined position on the bearing fixing portion 38.

The first regulation piece 39Mi and the second regulation piece 39Mx are each formed into a plate-like shape. The first regulation piece 39Mi and the second regulation piece 39Mx include hypotenuses extending from an axial, predetermined position on the bearing fixing portion 38 to an outer peripheral edge of the end surface wall 37 and are thus formed into a substantially rectangular triangle as viewed in the axial direction. The first regulation piece 39Mi and the second regulation piece 39Mx therefore have a substantially similar shape to the first regulation wall 35Mi and the second regulation wall 35Mx.

In a state where the valve main body 14 is fitted in the valve housing portion 28, the first regulation piece 39Mi and the second regulation piece 39Mx are housed in the sloping region portion 34 of the valve main body 14. A rotational action of the valve main body 14 is not regulated within a range where the sloping region portion 34 is formed. When the valve main body 14 is further rotated and comes into abutment with the first regulation wall 35Mi and the second regulation wall 35Mx, the first regulation piece 39Mi and the second regulation piece 39Mx regulate the rotational action of the valve main body 14.

As illustrated in FIG. 7, the first regulation piece 39Mi and the second regulation piece 39Mx radially extend from a center of the bearing fixing portion 38 in the radial manner. When abutting against the first regulation wall 35Mi and the second regulation wall 35Mx, the first regulation piece 39Mi and the second regulation piece 39Mx have surface contact with the first regulation wall 35Mi and the second regulation wall 35Mx. This makes it possible to reduce the stress per unit area which acts on the regulation pieces 39Mi and 39Mx and the regulation walls 35Mi and 35Mx, to thereby increase durability.

Figure 8:
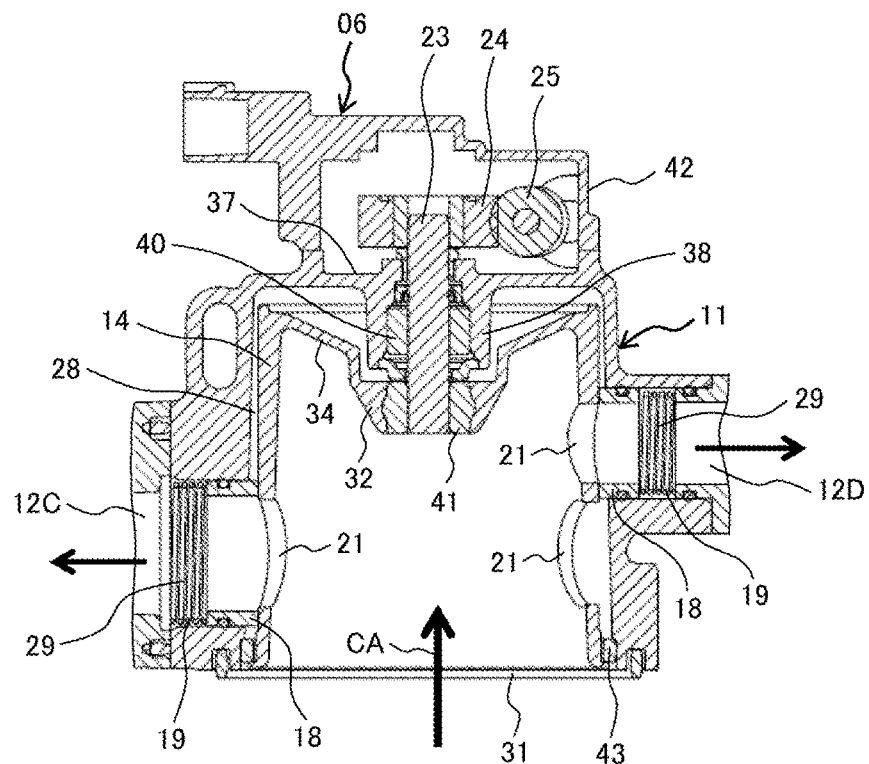
FIG. 8 is a cross-sectional view of the flow path switching valve illustrated in FIG. 2, along an axial line B-B.
Figure 9:
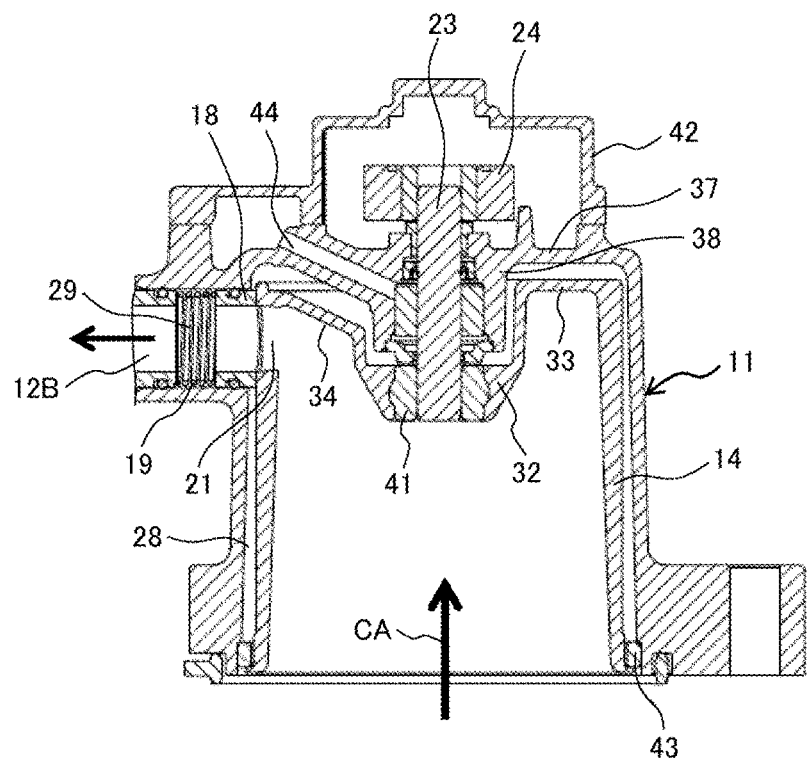
FIG. 9 is a cross-sectional view of the flow path switching valve illustrated in FIG. 2, along an axial line C-C.

FIG. 8 illustrates a cross-section along the line B-B of FIG. 2, and FIG. 9 illustrates a cross-section along the line C-C of FIG. 2. In FIGS. 8 and 9, the valve main body 14 is housed in the valve housing portion 28 that is formed inside the housing body 11. The drive shaft 23 is fixed in the drive shaft fixing portion 32 of the valve main body 14. The drive shaft 23 extends through the bearing fixing portion 38 of the housing body 11 and is rotatably supported by a slide bearing 40. In an interior portion of the drive shaft fixing portion 32 of the valve main body 14, a cylindrical press-fit fixing cylinder 41 made of metal is integrally insert-molded in the drive shaft fixing portion 32 made of synthetic resin.

A worm wheel 24 is fixed to an opposite end portion of the drive shaft 23 to a portion of the drive shaft 23, to which the valve main body 14 is fixed. Rotational motion is transmitted from the worm 25 to the worm wheel 24. The worm wheel 24 and the worm 25 are liquid-tightly covered with a cover 42 that is provided with the electronic flow path switching means 06. A ring-like slide bearing 43 is fitted at and fixed to an inner peripheral surface on the open end side of the valve housing portion 28 of the housing body 11 and slidably supports the outer peripheral portion 20 of the open portion 31 of the valve main body 14

A pressure release path 44 is formed in the end surface wall portion 37 facing the sloping region portion 34 of the valve main body 14. The pressure release path 44 allows a portion of the slide bearing 40 of the shaft fixing portion 38 to communicate with a space formed by the housing body 11 and the cover 42. With such a configuration, the pressure in the vicinity of the slide bearing 40 is released to atmosphere.

As illustrated in FIG. 9, the communication path 29, to which the connection pipe 12B linked to the heating apparatus 03 is attached, is formed in the vicinity of the end surface wall 37. Therefore, in order to facilitate a cooling water flow, the communication path 29 is formed within a range of operation of the sloping region portion 34 of the valve main body 14 so that channel resistance is maintained low. This allows the cooling water to flow into the communication path 29 along a sloping surface of the sloping region portion 34. The cooling water thus can flow into the communication 29 smoothly without receiving a great channel resistance in an area mentioned above.

In the foregoing description, the cooling water CA from the internal combustion engine flows into the connection pipe 12C toward the radiator 04 and at the same time flows into the connection pipe 12D toward the oil cooler 05 in FIG. 8. Likewise, as illustrated in FIG. 9, the cooling water CA from the internal combustion engine flows into the connection pipe 12B toward the heating apparatus 03. The connection pipes 12A to 12D are selectively connected to the opening portions 21 formed in the valve main body 14 in accordance with the rotational state of the valve main body 14.

As illustrated in FIGS. 8 and 9, the drive shaft 23 is press-fitted in the entire axial length of the press-fit fixing cylinder 41 that is embedded in the drive shaft fixing portion 32. When the drive shaft 23 which is made of metal is press-fitted in the press-fit fixing cylinder 41 which is also made of metal, the press-fit fixing cylinder 41 is outwardly pressed and enlarged in an outer circumferential direction due to the movement of the drive shaft 23 during the press-fitting process. The press-fit fixing cylinder 41 made of metal is thus deformed to expand, so that it is necessary to absorb the deformation with the valve main body 14 which is made of synthetic resin. The synthetic resin forming the valve main body 14, however, cannot be expected to be deformed enough to absorb the deformation of the press-fit fixing cylinder. Consequently, there has been the problem that the synthetic resin on the outer side of the press-fit fixing cylinder 41 is cracked or split, which causes a poor yield as a product.

In order to restrain the generation of a split or crack in the synthetic resin forming the drive shaft fixing portion 32 near the press-fit fixing cylinder 41 in which the drive shaft 23 is press-fitted, the invention suggests a configuration comprising the press-fit fixing cylinder 41 that is embedded in the drive shaft fixing portion 32 formed of synthetic resin and the drive shaft 23 that is press-fitted in a press-fit hole of the press-fit fixing cylinder 41, wherein a non-press-fit portion is provided in either one or both of the press-fit fixing cylinder 41 and the drive shaft 23, the non-press-fit portion comprising a space in a predetermined shape which releases the deformation of the press-fit fixing cylinder which is attributed to the press-fitting of the drive shaft 23. The following discussion describes representative embodiments of the invention.

Embodiment 1

A first embodiment of the invention will be described below with reference to FIG. 10. The embodiment is characterized in that the drive shaft 23 is press-fitted into the press-fit fixing cylinder 41 as far as an intermediate point of the press-fit fixing cylinder 41 to form a non-press-fit portion 47 between a distal end surface 23F of the drive shaft 23 and a press-fit hole 41H of the press-fit fixing cylinder 41. The non-press-fit portion 47 releases a force that is generated by deformation of the press-fit fixing cylinder 41 which is attributed to the press-fitting of the drive shaft 23. The following embodiments will be described on the premise that an area in which the drive shaft 23 and the press-fit hole 41H of the press-fit fixing cylinder 41 are in contact with each other is referred to as a "press-fit region."

Figure 10:
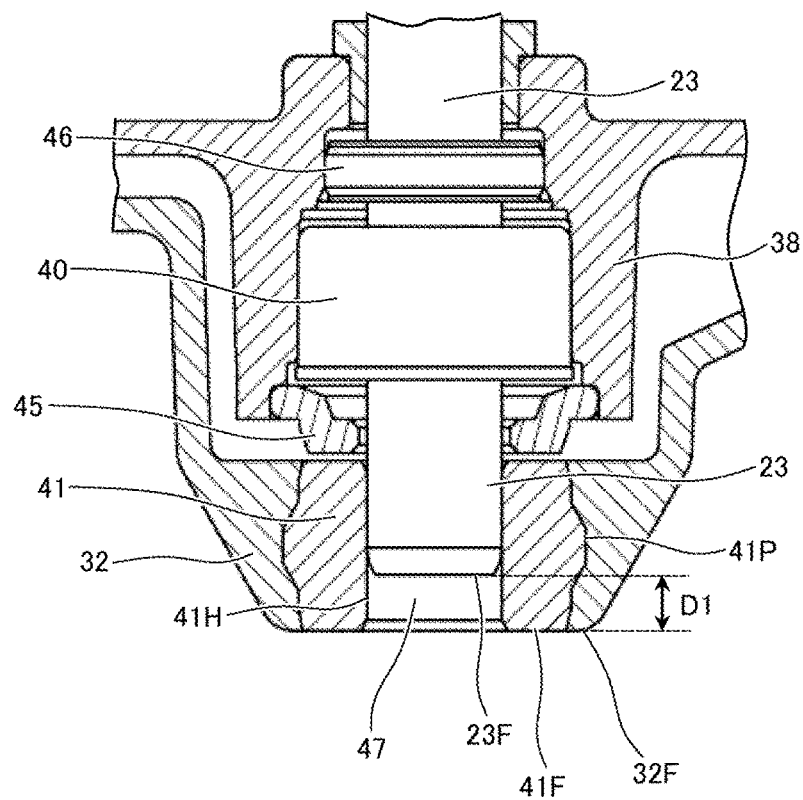
FIG. 10 is a cross-sectional view showing a cross-sectional surface of a main part of a valve body of a flow path switching valve according to a first embodiment of the invention.

In FIG. 10, the slide bearing 40 is provided inside the shaft fixing portion 38. The drive shaft 23 is rotatably supported by the slide bearing 40. The drive shaft 23 is made of metal. According to the present embodiment, the drive shaft 23 is made of stainless material that does not contain zinc. A seal member 45 is placed in the bearing fixing portion 38 on the valve main body 14 side of the slide bearing 40. A seal member 46 is placed in the bearing fixing portion 38 on an opposite side of the slide bearing 40 from the valve main body 14. The foregoing configuration prevents the cooling water from leaking into the cover 42 side.

The drive shaft fixing portion 32 having a conical trapezoidal shape is formed in a central portion of the valve main body 14 made of synthetic resin. The press-fit fixing cylinder 41 made of metal is integrally embedded about a central portion of the drive shaft fixing portion 32 by insert-molding. Formed at an outer peripheral portion of the press-fit fixing cylinder 41 is a ring-like projection 41P for retention. This prevents the press-fit fixing cylinder 41 from falling off of the drive shaft fixing portion 32. A distal end surface 32F of the drive shaft fixing portion 32 on an opposite side from the bearing fixing portion 38 and a distal end surface 41F of the press-fit fixing cylinder 41 on an opposite side from the bearing fixing portion 38 have a positional relation of being on the same plane (so-called flush surface).

The drive shaft 23 is press-fitted in and fixed to the press-fit hole 41H of the press-fit fixing cylinder 41 with predetermined interference. The drive shaft 23 is press-fitted in the press-fit fixing cylinder 41, but not far enough that the distal end surface 23F on the press-fit side of the drive shaft 23 reaches the distal end surface 41F of the press-fit fixing cylinder 41. In order to form the non-press-fit portion 47 having predetermined distance (D1), the drive shaft 23 is press-fitted in the press-fit fixing cylinder 41 only as far as the intermediate point of the press-fit fixing cylinder 41.

A reason why the drive shaft 23 is press-fitted as far as the intermediate point of the press-fit fixing cylinder 41 is that, if the non-press-fit portion 47 is formed, which comprises the space in the predetermined shape which is formed of the press-fit hole 41H located between the distal end surface 23F of the drive shaft 23 and the distal end surface 41F of the press-fit fixing cylinder 41, the deformation of the press-fit fixing cylinder 41 which is attributed to the press-fitting of the drive shaft 23 can be released by the non-press-fit portion 47. The predetermined shape may be a freely-selected shape as long as the shape functions to release the deformation of the press-fit fixing cylinder 41. Same applies to the other embodiments discussed below.

In other words, in the process of press-fitting the drive shaft 23 into the press-fit hole 41H of the press-fit fixing cylinder 41, the press-fit fixing cylinder 41 is expanded and deformed due to the press-fitting of the drive shaft 23. The deformation is absorbed by the non-press-fit portion 47 comprising the space in the predetermined shape. It is then possible to release the force generated by the deformation of the press-fit fixing cylinder 41 which acts on the synthetic resin of the drive shaft fixing portion 32 which is located around an outer periphery of the press-fit fixing cylinder 41. This makes it possible to restrain the generation of a crack or split in the synthetic resin of the drive shaft fixing portion 32 which is located around the outer periphery of the press-fit fixing cylinder 41.

When the press-fit fixing cylinder 41 is insert-molded with the drive shaft fixing portion 32, synthetic resin is injected using a gate from an opposite side to the distal end surface 32F of the drive shaft fixing portion 32. Especially in such a case, a strength-decreased region (for example, a welded portion, a void portion, and a gas-deposited portion) is generated on the distal end 32F side of the drive shaft fixing portion 32 and the distal end surface 41F side of the press-fit fixing cylinder 41, and is prone to be split or cracked. To solve this problem, the present embodiment forms the non-press-fit portion 47 that releases the force generated by the deformation and expansion of the press-fit fixing cylinder 41 which is attributed to the press-fitting, on the distal end 32F side of the drive shaft fixing portion 32 and the distal end surface 41F side of the press-fit fixing cylinder 41, to thereby restrain the generation of a split or crack in the strength-decreased region.

Axial length (D1) of the non-press-fit portion 47 in the axial direction of the drive shaft 23 may be freely determined as long as a fixing force obtained by the press-fitting is secured, and furthermore, the force generated by the deformation and expansion which is attributed to the press-fitting of the drive shaft 23 can be released.

Embodiment 2

A second embodiment of the invention will be now described with reference to FIG. 11. The embodiment is characterized in that a small diameter portion 48 is formed by reducing the thickness of the drive shaft 23 to be press-fitted from an intermediate point of the drive shaft 23 to the distal end surface 23F, and a non-press-fit portion 49 is formed between the small diameter portion 48 of the drive shaft 23 and the press-fit hole 41H of the press-fit fixing cylinder 41, the non-press-fit portion 49 being configured to release the force generated by the deformation of the press-fit fixing cylinder 41 which is attributed to the press-fitting of the drive shaft 23.

Figure 11:
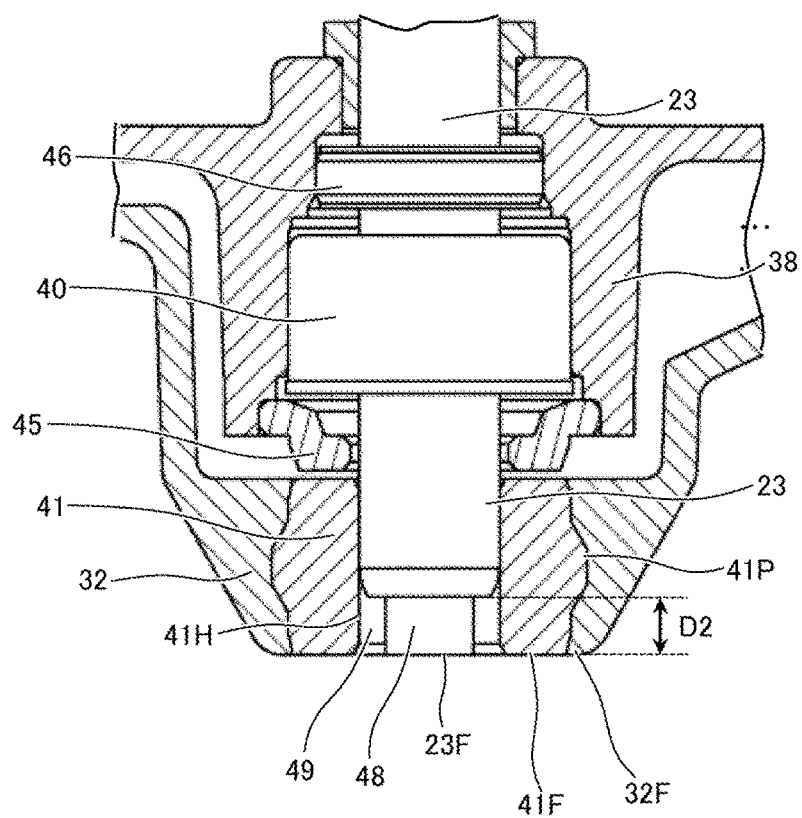
FIG. 11 is a cross-sectional view showing a cross-sectional surface of a main part of a valve body of a flow path switching valve according to a second embodiment of the invention.

In FIG. 11, the same reference signs as those in FIG. 10 represent corresponding components which have similar functions to those in FIG. 10. Overlapping descriptions may be omitted.

In FIG. 11, the drive shaft fixing portion 32 having a conical trapezoidal shape is formed in a central portion of the valve main body 14 made of synthetic resin. The press-fit fixing cylinder 41 made of metal is integrally embedded about a central portion of the drive shaft fixing portion 32 by insert-molding. Formed at the outer peripheral portion of the press-fit fixing cylinder 41 is a ring-like projection 41P for retention, which prevents the press-fit fixing cylinder 41 from falling off of the drive shaft fixing portion 32. The distal end surface 32F of the drive shaft fixing portion 32 on the opposite side from the bearing fixing portion 38 and the distal end surface 41F of the press-fit fixing cylinder 41 on the opposite side from the bearing fixing portion 38 have a positional relation of being on the same plane (so-called flush surface).

The drive shaft 23 is press-fitted in and fixed to the press-fit hole 41H of the press-fit fixing cylinder 41 with predetermined interference. A portion extending from the intermediate point of the drive shaft 23 on the press-fit side of the press-fit region to the distal end surface 23F is the small diameter portion 48 having predetermined length (D2). The non-press-fit portion 49 comprising a ring-like space is formed between the small diameter portion 48 and the press-fit hole 41H of the press-fit fixing cylinder 41. The non-press-fit portion 49 has a rectangular axial section. The aforementioned ring-like space is also an example of the predetermined shape.

The non-press-fit portion 49 comprising the ring-like space created by the press-fit hole 41H of the press-fit fixing cylinder 41 and the small diameter portion 48 is formed to extend from an intermediate point of the drive shaft 23 to the distal end surface 23F as described above, to thereby function to release the force generated by the deformation of the press-fit fixing cylinder 41 which is attributed to the press-fitting of the drive shaft 23. The distal end surface 23F of the drive shaft 23 reaches the distal end surface 41F of the press-fit fixing cylinder 41 to come into flush relation with the distal end surface 41F.

In the process of press-fitting the drive shaft 23 into the press-fit hole 41H of the press-fit fixing cylinder 41, the press-fit fixing cylinder 41 is expanded and deformed by the press-fitting of the drive shaft 23. The deformation of the press-fit fixing cylinder 41 is absorbed by the non-press-fit portion 49 comprising the ring-like space. It is then possible to release the force generated by the deformation of the press-fit fixing cylinder 41 which acts on the synthetic resin of the drive shaft fixing portion 32 which is located around the outer periphery of the press-fit fixing cylinder 41. This makes it possible to restrain the generation of a crack or split in the synthetic resin of the drive shaft fixing portion 32 which is located around the outer periphery of the press-fit fixing cylinder 41.

The present embodiment also injects synthetic resin using a gate from the opposite side to the distal end surface 32F of the drive shaft fixing portion 32 when insert-molding the press-fit fixing cylinder 41 with the drive shaft fixing portion 32. The strength-decreased region (for example, a welded portion, a void portion, and a gas-deposited portion) is generated on the distal end 32F side of the drive shaft fixing portion 32 and the distal end surface 41F side of the press-fit fixing cylinder 41, and is prone to be split or cracked. To solve this problem, the present embodiment forms the non-press-fit portion 49 that releases the force generated by the deformation and expansion of the press-fit fixing cylinder 41 which is attributed to the press-fitting of the drive shaft 23, between the small diameter portion 48 located on the distal end side of the drive shaft fixing portion 32 and the press-fit hole 41H of the press-fit fixing cylinder 41, to thereby restrain the generation of a split or crack in the strength-decreased region.

Embodiment 3

A third embodiment of the invention will be now described with reference to FIG. 12. The embodiment is characterized in that a tapered portion 50 is formed by gradually reducing a diameter of the drive shaft 23 to be press-fitted from an intermediate point of the drive shaft 23 to the distal end surface 23F to form a non-press-fit portion 51 between the tapered portion 50 of the drive shaft 23 and the press-fit hole 41H of the press-fit fixing cylinder 41, the non-press-fit portion 51 being configured to release the force generated by the deformation of the press-fit fixing cylinder 41 which is attributed to the press-fitting of the drive shaft 23.

Figure 12:
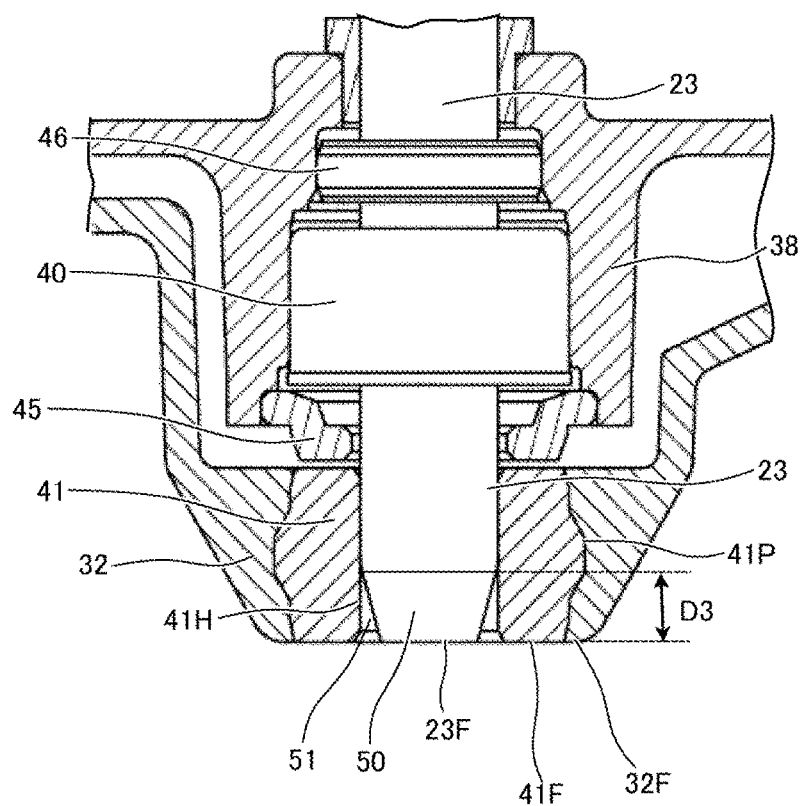
FIG. 12 is a cross-sectional view showing a cross-sectional surface of a main part of a valve body of a flow path switching valve according to a third embodiment of the invention.

In FIG. 12, the same reference signs as those in FIG. 10 represent corresponding components which have similar functions to those in FIG. 10. Overlapping descriptions may be omitted.

In FIG. 12, the drive shaft fixing portion 32 having a conical trapezoidal shape is formed in a central portion of the valve main body 14 made of synthetic resin. The press-fit fixing cylinder 41 made of metal is integrally embedded about a central portion of the drive shaft fixing portion 32 by insert-molding. Formed at the outer peripheral portion of the press-fit fixing cylinder 41 is the ring-like projection 41P for retention, which prevents the press-fit fixing cylinder 41 from falling off of the drive shaft fixing portion 32. The distal end surface 32F of the drive shaft fixing portion 32 on the opposite side from the bearing fixing portion 38 and the distal end surface 41F of the press-fit fixing cylinder 41 on the opposite side from the bearing fixing portion 38 have a positional relation of being on the same plane (so-called flush surface).

The drive shaft 23 is press-fitted in and fixed to the press-fit hole 41H of the press-fit fixing cylinder 41 with predetermined interference. A portion extending from the intermediate point of the drive shaft 23 on the press-fit side of the press-fit region to the distal end surface 23F is the tapered portion 50 with predetermined length (D3) which is gradually reduced in diameter. The non-press-fit portion 51 comprising a ring-like space is formed between the tapered portion 50 and the press-fit hole 41H of the press-fit fixing cylinder 41. The non-press-fit portion 51 has a triangular axial cross-section. The aforementioned ring-like space is also an example of the predetermined shape.

The non-press-fit portion 51 comprising the ring-like space created by the tapered portion 50 is formed to extend from the intermediate point of the drive shaft 23 to the distal end surface 23F as described above. The non-press-fit portion 51 thus function to release the force generated by the deformation of the press-fit fixing cylinder 41 which is attributed to the press-fitting of the drive shaft 23. The distal end surface 23F of the drive shaft 23 reaches the distal end surface 41F of the press-fit fixing cylinder 41 to come into flush relation with the distal end surface 41F.

In the process of press-fitting the drive shaft 23 into the press-fit hole 41H of the press-fit fixing cylinder 41, the press-fit fixing cylinder 41 is expanded and deformed due to the press-fitting of the drive shaft 23. The deformation of the press-fit fixing cylinder 41 is absorbed by the non-press-fit portion 51 comprising the ring-like space. It is then possible to release the force generated by the deformation of the press-fit fixing cylinder 41 which acts on the synthetic resin of the drive shaft fixing portion 32 which is located around an outer periphery of the press-fit fixing cylinder 41. This makes it possible to restrain the generation of a crack or split in the synthetic resin of the drive shaft fixing portion 32 which is located around the outer periphery of the press-fit fixing cylinder 41.

The present embodiment also injects synthetic resin using a gate from the opposite side to the distal end surface 32F of the drive shaft fixing portion 32 when insert-molding the press-fit fixing cylinder 41 with the drive shaft fixing portion 32. The strength-decreased region (for example, a welded portion, a void portion, and a gas-deposited portion) is generated on the distal end 32F side of the drive shaft fixing portion 32 and the distal end surface 41F side of the press-fit fixing cylinder 41, and is prone to be split or cracked. To solve this problem, the present embodiment forms the non-press-fit portion 51 that releases the force generated by the deformation and expansion of the press-fit fixing cylinder 41 which is attributed to the press-fitting of the drive shaft 23, between the tapered portion 50 located on the distal end side of the drive shaft 23 and the press-fit hole 41H of the press-fit fixing cylinder 41, to thereby restrain the generation of a split or crack in the strength-decreased region.

Embodiment 4

A fourth embodiment will be now described with reference to FIG. 13. According to the embodiment, a small diameter portion 52 is provided in an intermediate area of the drive shaft 23, and another press-fit portion 53 is further formed closer to the distal end side than the small diameter portion 52. A tapered portion 55 is further formed by gradually reducing the diameter of a portion of the drive shaft 23 which extends from the press-fit portion 53 to the distal end surface 23F. The embodiment is characterized by forming non-press-fit portions 53, 56 between the small diameter portion 52 of the drive shaft 23 and the press-fit hole 41H of the press-fit fixing cylinder 41 and between the tapered portion 55 and the press-fit hole 41H of the press-fit fixing cylinder 41, the non-press-fit portions 53, 56 being configured to release the force generated by the deformation of the press-fit fixing cylinder 41 which is attributed to the press-fitting of the drive shaft 23.

Figure 13:
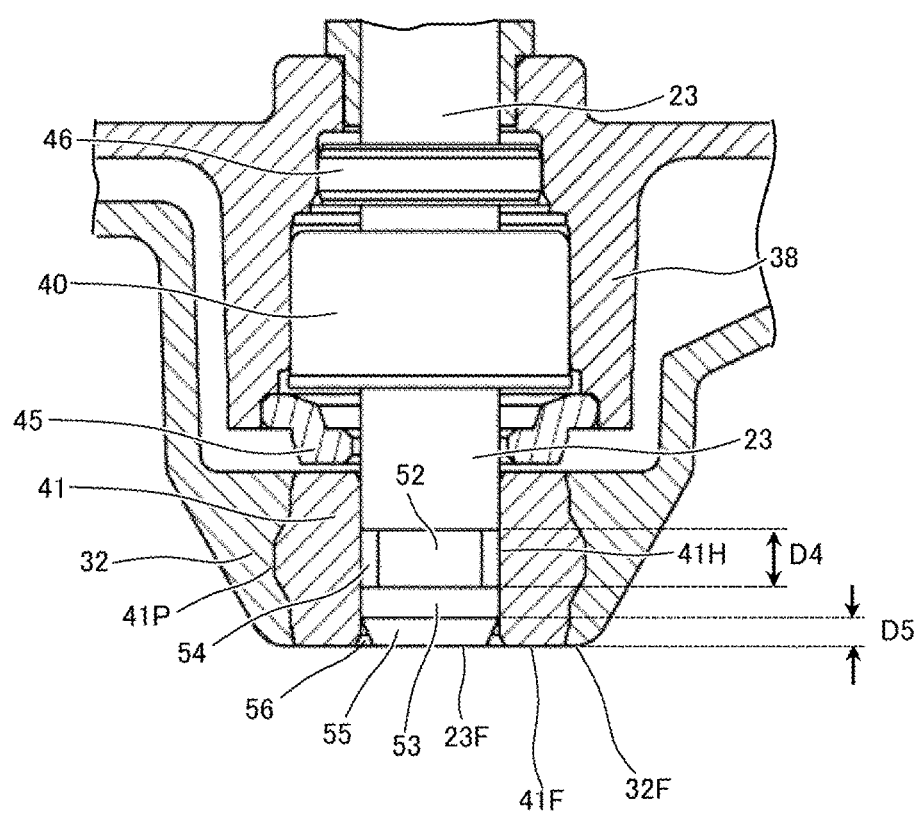
FIG. 13 is a cross-sectional view showing a cross-sectional surface of a main part of a valve body of a flow path switching valve according to a fourth embodiment of the invention.

In FIG. 13, the same reference signs as those in FIG. 10 represent corresponding components which have similar functions to those in FIG. 10. Overlapping descriptions may be omitted.

In FIG. 13, the drive shaft fixing portion 32 having a conical trapezoidal shape is formed in a central portion of the valve main body 14 made of synthetic resin. The press-fit fixing cylinder 41 made of metal is integrally embedded about a central portion of the drive shaft fixing portion 32 by insert-molding. Formed at the outer peripheral portion of the press-fit fixing cylinder 41 is a ring-like projection 41P for retention, which prevents the press-fit fixing cylinder 41 from falling off of the drive shaft fixing portion 32. The distal end surface 32F of the drive shaft fixing portion 32 on the opposite side from the bearing fixing portion 38 and the distal end surface 41F of the press-fit fixing cylinder 41 on the opposite side from the bearing fixing portion 38 have a positional relation of being on the same plane (so-called flush surface).

The drive shaft 23 is press-fitted in and fixed to the press-fit hole 41H of the press-fit fixing cylinder 41 with predetermined interference. The small diameter portion 52 is formed in an intermediate area of the drive shaft 23 on the press-fit side to extend at predetermined length (D4). Formed on a further distal side is another press-fit portion 53. A non-press-fit portion 54 comprising a ring-like space is formed between the small diameter portion 52 and the press-fit hole 41H of the press-fit fixing cylinder 41. The non-press-fit portion 54 has a rectangular axial cross-section. The aforementioned ring-like space is also an example of the predetermined shape.

A portion extending from the press-fit portion 53 to the distal end surface 23 of the drive shaft 23 is the tapered portion 55 that extends at predetermined length (D5). The non-press-fit portion 56 comprising a ring-like space is formed between the tapered portion 55 and the press-fit hole 41H of the press-fit fixing cylinder 41. The non-press-fit portion 56 has a substantially triangular axial cross-section.

The non-press-fit portion 54 comprising the ring-like space formed by the small diameter portion 52 and the non-press-fit portion 56 comprising the ring-like space formed by the tapered portion 55 extending from the press-fit portion 53 to the distal end surface 23F are formed between an intermediate point of the drive shaft 23 and the distal end surface 23F. The non-press-fit portion 54 and the non-press-fit portion 56 function to release the force generated by the deformation of the press-fit fixing cylinder 41 which is attributed to the press-fitting of the drive shaft 23. The distal end surface 23F of the drive shaft 23 reaches the distal end surface 41F of the press-fit fixing cylinder 41 to come into flush relation with the distal end surface 41F.

In the process of press-fitting the drive shaft 23 into the press-fit hole 41H of the press-fit fixing cylinder 41, the press-fit fixing cylinder 41 is expanded and deformed by the press-fitting of the drive shaft 23. The deformation of the press-fit fixing cylinder 41 is absorbed by the non-press-fit portions 54 and 56 comprising the ring-like spaces. This makes it possible to release the force generated by the deformation of the press-fit fixing cylinder 41 which acts on the synthetic resin of the drive shaft fixing portion 32 which is located around the outer periphery of the press-fit fixing cylinder 41. It is therefore possible to restrain the generation of a crack or split in the synthetic resin of the drive shaft fixing portion 32 which is located around the outer periphery of the press-fit fixing cylinder 41.

The present embodiment also injects synthetic resin using a gate from the opposite side to the distal end surface 32F of the drive shaft fixing portion 32 when insert-molding the press-fit fixing cylinder 41 with the drive shaft fixing portion 32. The strength-decreased region (for example, a welded portion, a void portion, and a gas-deposited portion) is generated on the distal end 32F side of the drive shaft fixing portion 32 and the distal end surface 41F side of the press-fit fixing cylinder 41, and is prone to be split or cracked. To solve this problem, the present embodiment forms the non-press-fit portion 56 that releases the force generated by the deformation and expansion of the press-fit fixing cylinder 41 which is attributed to the press-fitting of the drive shaft 23, between the tapered portion 55 on the distal end side of the drive shaft 23 and the press-fit hole 41H of the press-fit fixing cylinder 41, to thereby restrain the generation of a split or crack in the strength-decreased region.

According to the present embodiment, furthermore, the non-press-fit portion 54 is also formed about an axial center (in the present embodiment, a region where the ring-like projection 41P for retention is located) of the press-fit fixing cylinder 41. Since the press-fit portion 53 is formed on the distal end side of the drive shaft 23, even if the expansion and deformation of the press-fit fixing cylinder 41 are generated, the non-press-fit 54 absorbs the force generated by the expansion and deformation. It is therefore possible to release the force generated by the deformation of the press-fit fixing cylinder 41 which acts on the synthetic resin of the drive shaft fixing portion 32 which is located around the outer periphery of the press-fit fixing cylinder 41. This makes it possible to restrain the generation of a crack or split in the synthetic resin of the drive shaft fixing portion 32 which is located around the outer periphery of the press-fit fixing cylinder 41.

Embodiment 5

A fifth embodiment of the invention will be now described with reference to FIG. 14. According to the embodiment, a press-fit portion 57 is formed in an intermediate area of the drive shaft 23 to be press-fitted. A portion of the drive shaft 23 which extends from the press-fit portion 57 to the bearing fixing portion 38-side end of the drive shaft 23 (opposite side from the distal end of the drive shaft) is a small diameter portion 58. A portion of the drive shaft 23 which extends from the press-fit portion 57 to the distal end surface 23F is gradually reduced in diameter to form a tapered portion 59. Consequently, non-press-fit portions 60, 61 are respectively formed between the small diameter portion 58 of the drive shaft 23 and the press-fit hole 41H of the press-fit fixing cylinder 41 and between the tapered portion 59 and the press-fit hole 41H of the press-fit fixing cylinder 41. The non-press-fit portions 60, 61 release the force generated by the deformation of the press-fit fixing cylinder 41 which is caused by the press-fit portion 57 of the drive shaft 23.

Figure 14:
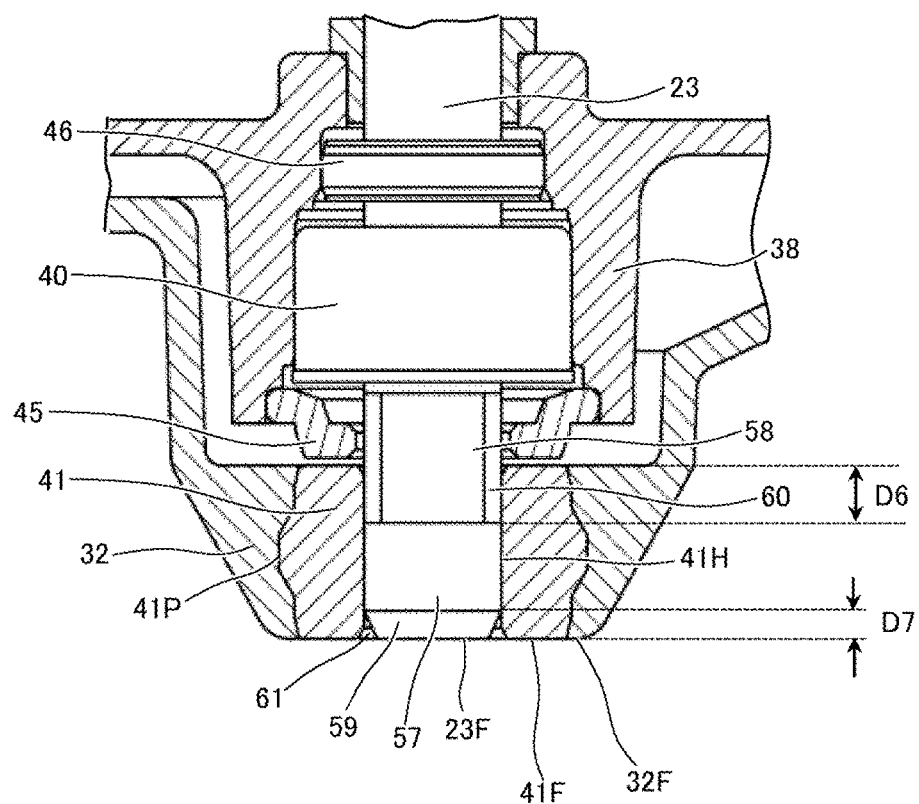
FIG. 14 is a cross-sectional view showing a cross-sectional surface of a main part of a valve body of a flow path switching valve according to a fifth embodiment of the invention.

In FIG. 14, the same reference signs as those in FIG. 10 represent corresponding components which have similar functions to those in FIG. 10. Overlapping descriptions may be omitted.

In FIG. 14, the drive shaft fixing portion 32 having a conical trapezoidal shape is formed in a central portion of the valve main body 14 made of synthetic resin. The press-fit fixing cylinder 41 made of metal is integrally embedded about a central portion of the drive shaft fixing portion 32 by insert-molding. Formed at the outer peripheral portion of the press-fit fixing cylinder 41 is a ring-like projection 41P for retention, which prevents the press-fit fixing cylinder 41 from falling off of the drive shaft fixing portion 32. The distal end surface 32F of the drive shaft fixing portion 32 on the opposite side from the bearing fixing portion 38 and the distal end surface 41F of the press-fit fixing cylinder 41 on the opposite side from the bearing fixing portion 38 have a positional relation of being on the same plane (so-called flush surface).

The press-fit portion 57 is formed in the intermediate area of the drive shaft 23, or the distal end side in the present embodiment. The press-fit portion 57 is press-fitted in and fixed to the press-fit hole 41H of the press-fit fixing cylinder 41 with predetermined interference. A portion of the drive shaft 23 which extends from the press-fit portion 57 to the bearing fixing portion 38-side end of the drive shaft 23 is the small diameter portion 58. The non-press-fit portion 60 comprising a ring-like space and having predetermined length (D6) is formed between the small diameter portion 58 and the press-fit hole 41H of the press-fit fixing cylinder 41. The non-press-fit portion 60 has a rectangular axial cross-section. The aforementioned ring-like space is also an example of the predetermined shape.

A portion between the press-fit portion 57 formed in the intermediate area of the drive shaft 23 and the distal end surface 23F is the tapered portion 59 with predetermined length (D7) which is gradually reduced in diameter. The non-press-fit portion 61 comprising a ring-like space is formed between the tapered portion 59 and the press-fit hole 41H of the press-fit fixing cylinder 41. The non-press-fit portion 61 has a triangular axial cross-section.

A portion extending from the press-fit portion 57 formed in the intermediate area of the drive shaft 23 to the fixing portion 58-side end of the drive shaft 23 is the small diameter portion 58 to form the non-press-fit portion 60 comprising the ring-like space formed by the small diameter portion 58 and the non-press-fit portion 61 comprising the ring-like space formed by the tapered portion 50 extending from the press-fit portion 57 to the distal end surface 23F, to thereby function to release the force generated by the deformation of the press-fit fixing cylinder 41 which is attributed to the press-fitting of the drive shaft 23. The distal end surface 23F of the drive shaft 23 reaches the distal end surface 41F of the press-fit fixing cylinder 41 to come into flush relation with the distal end surface 41F.

In the process of press-fitting the drive shaft 23 into the press-fit hole 41H of the press-fit fixing cylinder 41, the press-fit fixing cylinder 41 is expanded and deformed by the press-fitting of the drive shaft 23. The deformation of the press-fit fixing cylinder 41 is absorbed by the non-press-fit portions 60, 61 comprising the ring-like spaces. It is then possible to release the force generated by the deformation of the press-fit fixing cylinder 41 which acts on the synthetic resin of the drive shaft fixing portion 32 which is located around the outer periphery of the press-fit fixing cylinder 41. This makes it possible to restrain the generation of a crack or split in the synthetic resin of the drive shaft fixing portion 32 which is located around the outer periphery of the press-fit fixing cylinder 41.

The present embodiment also injects synthetic resin using a gate from the opposite side to the distal end surface 32F of the drive shaft fixing portion 32 when insert-molding the press-fit fixing cylinder 41 with the drive shaft fixing portion 32. The strength-decreased region (for example, a welded portion, a void portion, and a gas-deposited portion) is generated on the distal end 32F side of the drive shaft fixing portion 32 and the distal end surface 41F side of the press-fit fixing cylinder 41, and is prone to be split or cracked. To solve this problem, the present embodiment forms the non-press-fit portion 61 that releases the force generated by the deformation and expansion of the press-fit fixing cylinder 41 which is attributed to the press-fitting of the drive shaft 23, between the tapered portion 59 located on the distal end side of the drive shaft 23 and the press-fit hole 41H of the press-fit fixing cylinder 41, to thereby restrain the generation of a split or crack in the strength-decreased region.

The present embodiment further forms the non-press-fit portion 60 on the bearing fixing portion 38 side of the press-fit fixing cylinder 41. Accordingly, even if the press-fit fixing cylinder 41 is expanded and deformed by the formation of the press-fit portion 57 on the distal end side of the drive shaft 23, the non-press-fit portion 60 absorbs the force generated by the expansion and deformation. It is therefore possible to release the force generated by the deformation of the press-fit fixing cylinder 41 which acts on the synthetic resin of the drive shaft fixing portion 32 which is located around the outer periphery of the press-fit fixing cylinder 41. This makes it possible to restrain the generation of a crack or split in the synthetic resin of the drive shaft fixing portion 32 which is located around the outer periphery of the press-fit fixing cylinder 41.

Embodiment 6

A sixth embodiment of the invention will be described below with reference to FIG. 15. The embodiment is characterized in that a non-press-fit portion 62 is provided by forming a space extending from the distal end surface 23F of the drive shaft 23 to be press-fitted along the axis of the drive shaft 23 toward the bearing fixing portion 38, to thereby release the force generated by the deformation of the press-fit fixing cylinder 41 which is attributed to the press-fitting of the drive shaft 23.

Figure 15:
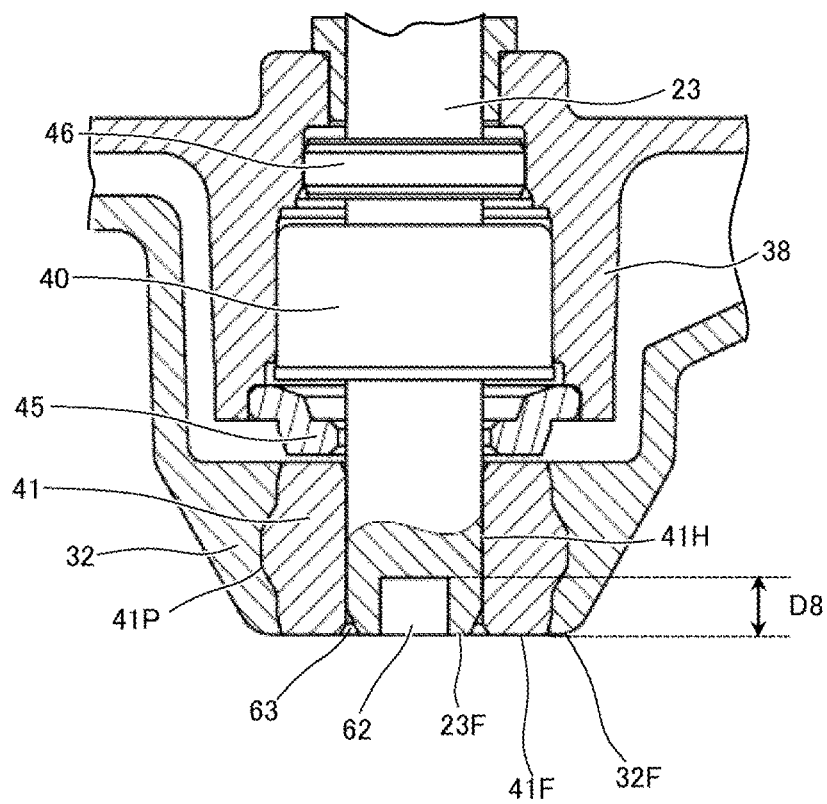
FIG. 15 is a cross-sectional view showing a cross-sectional surface of a main part of a valve body of a flow path switching valve according to a sixth embodiment of the invention.

In FIG. 15, the same reference signs as those in FIG. 10 represent corresponding components which have similar functions to those in FIG. 10. Overlapping descriptions may be omitted.

In FIG. 15, the drive shaft fixing portion 32 having a conical trapezoidal shape is formed in a central portion of the valve main body 14 made of synthetic resin. The press-fit fixing cylinder 41 made of metal is integrally embedded about a central portion of the drive shaft fixing portion 32 by insert-molding. Formed at the outer peripheral portion of the press-fit fixing cylinder 41 is a ring-like projection 41P for retention, which prevents the press-fit fixing cylinder 41 from falling off of the drive shaft fixing portion 32. The distal end surface 32F of the drive shaft fixing portion 32 on the opposite side from the bearing fixing portion 38 and the distal end surface 41F of the press-fit fixing cylinder 41 on the opposite side from the bearing fixing portion 38 have a positional relation of being on the same plane (so-called flush surface). The embodiment forms the space along the axis of the drive shaft 23 toward the bearing fixing portion 38 and uses the space as the non-press-fit portion 62.

The space to be used as the non-press-fit portion 62 is formed to extend from the distal end surface 23F of the drive shaft 23 along the axis of the drive shaft 23 toward the bearing fixing portion 38. The space to be used as the non-press-fit portion 62 has depth of predetermined length (D8) along the axis of the drive shaft 23 and has a smaller diameter than the drive shaft 23. The space formed in the drive shaft 23 is also an example of the predetermined shape.

The non-press-fit portion 62 comprising the space formed in a distal end portion of the drive shaft 23 is formed as described, to thereby function to release the force generated by the deformation of the press-fit fixing cylinder 41 which is attributed to the press-fitting of the drive shaft 23. The distal end surface 23F of the drive shaft 23 reaches the distal end surface 41F of the press-fit fixing cylinder 41 to come into flush relation with the distal end surface 41F.

In the process of press-fitting the drive shaft 23 into the press-fit hole 41H of the press-fit fixing cylinder 41, the press-fit fixing cylinder 41 is expanded and deformed by the press-fitting of the drive shaft 23. The deformation of the press-fit fixing cylinder 41 is absorbed by the non-press-fit portion 62 comprising the space formed in the drive shaft 23. It is then possible to release the force generated by the deformation of the press-fit fixing cylinder 41 which acts on the synthetic resin of the drive shaft fixing portion 32 which is located around the outer periphery of the press-fit fixing cylinder 41. This makes it possible to restrain the generation of a crack or split in the synthetic resin of the drive shaft fixing portion 32 which is located around the outer periphery of the press-fit fixing cylinder 41.

The present embodiment also injects synthetic resin using a gate from the opposite side to the distal end surface 32F of the drive shaft fixing portion 32 when insert-molding the press-fit fixing cylinder 41 with the drive shaft fixing portion 32. The strength-decreased region (for example, a welded portion, a void portion, and a gas-deposited portion) is generated on the distal end 32F side of the drive shaft fixing portion 32 and the distal end surface 41F side of the press-fit fixing cylinder 41, and is prone to be split or cracked. To solve this problem, the present embodiment forms the non-press-fit portion 62 on the distal end side of the drive shaft 23. The non-press-fit portion 62 releases the force generated by the deformation and expansion of the press-fit fixing cylinder 41 which is attributed to the press-fitting of the drive shaft 23, to thereby restrain the generation of a split or crack in the strength-decreased region.

A non-press-fit portion 63 is formed by a tapered portion formed at the distal end of the drive shaft 23, between the tapered portion and the press-fit hole 41H of the press-fit fixing cylinder 41. The non-press-fit portion 63 can provide similar operation and effects to those of the other embodiments discussed above.

In the several embodiments described above, the non-press-fit portions comprising the spaces in the predetermined shapes are formed on the drive shaft side. However, non-press-fit portions comprising spaces in predetermined shapes may be formed on the press-fit fixing cylinder side. The following discussion describes embodiments in which non-press-fit portions comprising spaces in predetermined shapes are formed on the press-fit fixing cylinder side. The same reference signs represent corresponding components, which have similar functions, and overlapping descriptions may be omitted.

Embodiment 7

A seventh embodiment of the invention will be described below with reference to FIG. 16. The embodiment is characterized in that, in order to release the force generated by the deformation of the press-fit fixing cylinder 41 which is attributed to the press-fitting of the drive shaft 23, a non-press-fit portion 64 is formed in the distal end surface 41F of the press-fit fixing cylinder 41 in which the drive shaft 23 is press-fitted. The non-press-fit portion 64 comprises a ring-like space surrounding the distal end portion of the drive shaft 23.

Figure 16:
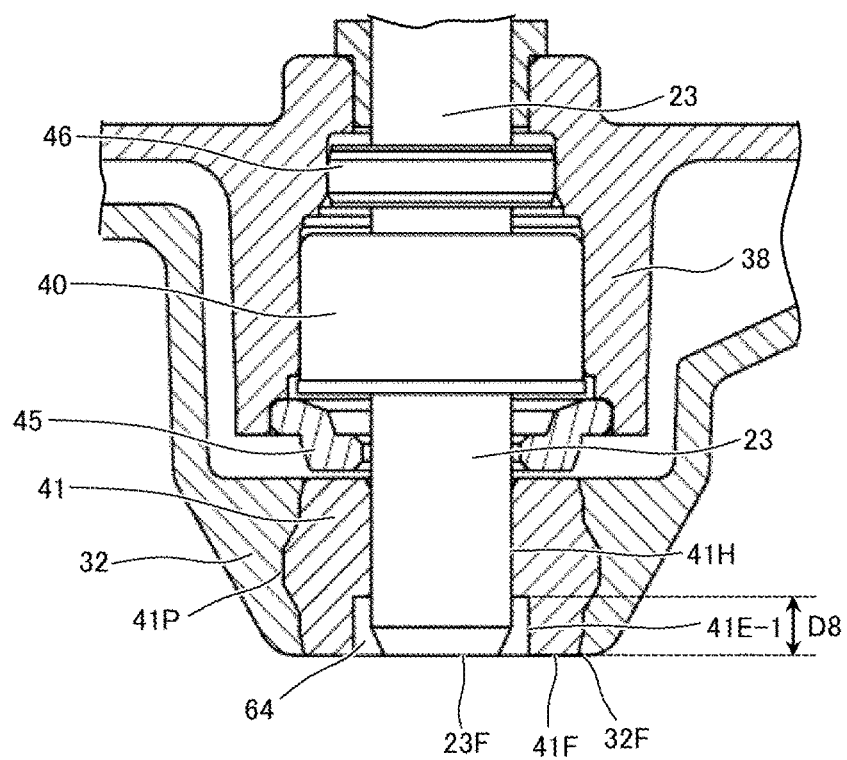
FIG. 16 is a cross-sectional view showing a cross-sectional surface of a main part of a valve body of a flow path switching valve according to a seventh embodiment of the invention.

In FIG. 16, the same reference signs as those in FIG. 10 represent corresponding components which have similar functions to those in FIG. 10. Overlapping descriptions may be omitted.

In FIG. 16, the drive shaft fixing portion 32 having a conical trapezoidal shape is formed in a central portion of the valve main body 14 made of synthetic resin. The press-fit fixing cylinder 41 made of metal is integrally embedded about a central portion of the drive shaft fixing portion 32 by insert-molding. Formed at an outer peripheral portion of the press-fit fixing cylinder 41 is the ring-like projection 41P for retention, which prevents the press-fit fixing cylinder 41 from falling off of the drive shaft fixing portion 32. A distal end surface 32F of the drive shaft fixing portion 32 on an opposite side from the bearing fixing portion 38 and the distal end surface 41F of the press-fit fixing cylinder 41 on an opposite side from the bearing fixing portion 38 have a positional relation of being on the same plane (so-called flush surface).

The drive shaft 23 is press-fitted in and fixed to the press-fit hole 41H of the press-fit fixing cylinder 41 with predetermined interference. A portion of the press-fit hole 41H of the press-fit fixing cylinder 41 which is located between an intermediate point of the drive shaft 23 and the distal end surface 23F is an enlarged hole 41E-1. The enlarged hole 41E-1 forms a ring-like space having predetermined length (D8) between the enlarged hole 41E-1 and the drive shaft 23. The enlarged hole 41E-1 has predetermined diameter. In other words, the diameter of the enlarged hole 41E-1 of the press-fit fixing cylinder 41 is set larger than the diameter of the drive shaft 23, resulting in the formation of the ring-like space. Such a ring-like space is also an example of the predetermined shape.

The ring-like space functions as the non-press-fit portion 64 that releases the force generated by the deformation and expansion of the press-fit fixing cylinder 41 which is attributed to the press-fitting of the drive shaft 23 and can restrain the generation of a split of crack in the strength-decreased region. The non-press-fit portion 64 comprising the ring-like space formed of the enlarged hole 41E-1 is formed between the intermediate point of the drive shaft 23 and the distal end surface 23F as described above, to thereby function to release the force generated by the deformation of the press-fit fixing cylinder 41 which is attributed to the press-fitting of the drive shaft 23. The distal end surface 23F of the drive shaft 23 reaches the distal end surface 41F of the press-fit fixing cylinder 41 to come into flush relation with the distal end surface 41F.

In the process of press-fitting the drive shaft 23 into the press-fit hole 41H of the press-fit fixing cylinder 41, the press-fit fixing cylinder 41 is expanded and deformed due to the press-fitting of the drive shaft 23. The deformation of the press-fit fixing cylinder 41 is absorbed by the non-press-fit portion 64 comprising the ring-like space of the press-fit fixing cylinder 41. It is then possible to release the force generated by the deformation of the press-fit fixing cylinder 41 which acts on the synthetic resin of the drive shaft fixing portion 32 which is located around an outer periphery of the press-fit fixing cylinder 41. This makes it possible to restrain the generation of a crack or split in the synthetic resin of the drive shaft fixing portion 32 which is located around the outer periphery of the press-fit fixing cylinder 41.

The present embodiment also injects synthetic resin using a gate from the opposite side to the distal end surface 32F of the drive shaft fixing portion 32 when insert-molding the press-fit fixing cylinder 41 with the drive shaft fixing portion 32. The strength-decreased region (for example, a welded portion, a void portion, and a gas-deposited portion) is generated on the distal end 32F side of the drive shaft fixing portion 32 and the distal end surface 41F side of the press-fit fixing cylinder 41, and is prone to be split or cracked. To solve this problem, the present embodiment forms the non-press-fit portion 64 that releases the force generated by the deformation and expansion of the press-fit fixing cylinder 41 which is attributed to the press-fitting of the drive shaft 23, on the enlarged hole 41E-1 side of the drive shaft 23 and the press-fit fixing cylinder 41, to thereby restrain the generation of a split or crack in the strength-decreased region.

Embodiment 8

An eighth embodiment of the invention will be now described with reference to FIG. 17. The embodiment is characterized in that a non-press-fit portion 65 is formed about an axial center of the press-fit fixing cylinder 41 in which the drive shaft 23 is press-fitted in order to release the force generated by the deformation of the press-fit fixing cylinder 41 which is attributed to the press-fitting of the drive shaft 23. The non-press-fit portion 65 comprises a ring-like space surrounding a periphery of the drive shaft 23.

Figure 17:
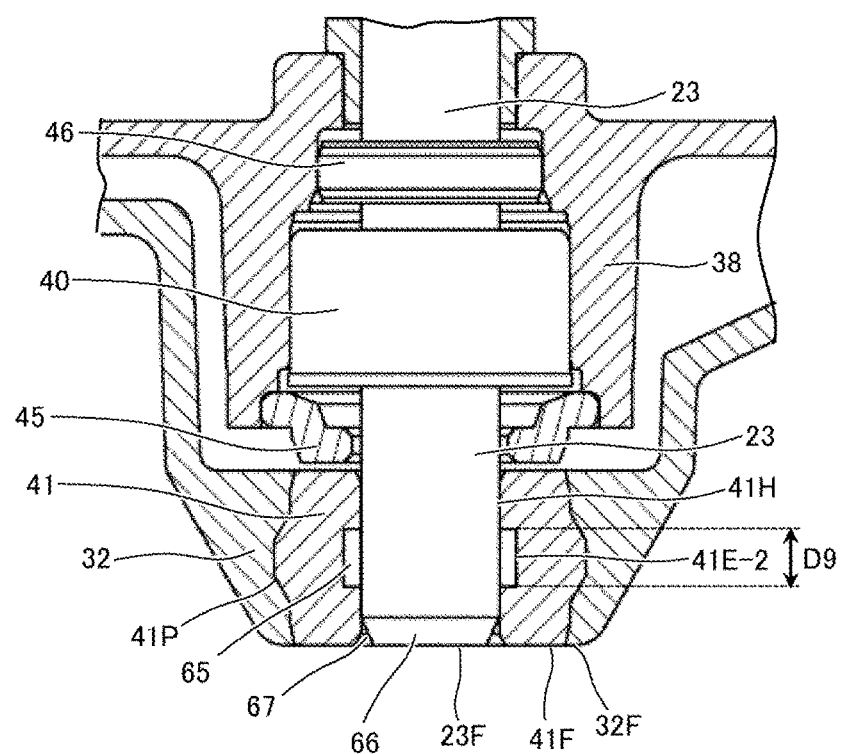
FIG. 17 is a cross-sectional view showing a cross-sectional surface of a main part of a valve body of a flow path switching valve according to an eighth embodiment of the invention.

In FIG. 17, the same reference signs as those in FIG. 10 represent corresponding components which have similar functions to those in FIG. 10. Overlapping descriptions may be omitted.

In FIG. 17, the drive shaft fixing portion 32 having a conical trapezoidal shape is formed in a central portion of the valve main body 14 made of synthetic resin. The press-fit fixing cylinder 41 made of metal is integrally embedded about a central portion of the drive shaft fixing portion 32 by insert-molding. Formed at the outer peripheral portion of the press-fit fixing cylinder 41 is the ring-like projection 41P for retention, which prevents the press-fit fixing cylinder 41 from falling off of the drive shaft fixing portion 32. The distal end surface 32F of the drive shaft fixing portion 32 on the opposite side from the bearing fixing portion 38 and the distal end surface 41F of the press-fit fixing cylinder 41 on the opposite side from the bearing fixing portion 38 have a positional relation of being on the same plane (so-called flush surface).

The drive shaft 23 is press-fitted in and fixed to the press-fit hole 41H of the press-fit fixing cylinder 41 with predetermined interference. A portion of the press-fit hole 41H of the press-fit fixing cylinder 41 which is located in an intermediate area of the drive shaft 23 is formed as an enlarged hole 41E-2. The enlarged hole 41E-2 forms a ring-like space having predetermined length (D9) between the press-fit hole 41H and the drive shaft 23. The enlarged hole 41E-2 has predetermined diameter. In other words, the diameter of the enlarged hole 41E-2 of the press-fit fixing cylinder 41 is set larger than the diameter of the drive shaft 23, resulting in the formation of the ring-like space having the length (D9). Such a ring-like space is also an example of the predetermined shape.

The ring-like space functions as the non-press-fit portion 65 that releases the force generated by the deformation and expansion of the press-fit fixing cylinder 41 which is attributed to the press-fitting of the drive shaft 23. It is then possible to restrain the generation of a split or crack in synthetic resin around the press-fit fixing cylinder 41. The non-press-fit portion 65 comprising the ring-like space formed of the enlarged hole 41E-2 is formed in an intermediate area of the drive shaft 23 as described above, to thereby function to release the force generated by the deformation of the press-fit fixing cylinder 41 which is attributed to the press-fitting of the drive shaft 23. The distal end surface 23F of the drive shaft 23 reaches the distal end surface 41F of the press-fit fixing cylinder 41 to come into flush relation with the distal end surface 41F.

In the process of press-fitting the drive shaft 23 into the press-fit hole 41H of the press-fit fixing cylinder 41, the press-fit fixing cylinder 41 is expanded and deformed due to the press-fitting of the drive shaft 23. The deformation of the press-fit fixing cylinder 41 is absorbed by the non-press-fit portion 65 comprising the ring-like space of the press-fit fixing cylinder 41. It is then possible to release the force generated by the deformation of the press-fit fixing cylinder 41 which acts on the synthetic resin of the drive shaft fixing portion 32 which is located around the press-fit fixing cylinder 41. This makes it possible to restrain the generation of a crack or split in the synthetic resin of the drive shaft fixing portion 32 which is located around the outer periphery of the press-fit fixing cylinder 41.

Like the embodiments illustrated in FIGS. 13 and 14, a portion extending to the distal end surface 23F of the drive shaft 23 is a tapered portion 66 with predetermined length which is gradually reduced in diameter. A non-press-fit portion 67 comprising a ring-like space is formed between the tapered portion 66 and the press-fit hole 41H of the press-fit fixing cylinder 41. The non-press-fit portion 67 has a triangular axial cross-section.

The present embodiment also injects synthetic resin using a gate from the opposite side to the distal end surface 32F of the drive shaft fixing portion 32 when insert-molding the press-fit fixing cylinder 41 with the drive shaft fixing portion 32. The strength-decreased region (for example, a welded portion, a void portion, and a gas-deposited portion) is generated on the distal end 32F side of the drive shaft fixing portion 32 and the distal end surface 41F side of the press-fit fixing cylinder 41, and is prone to be split or cracked. To solve this problem, the present embodiment forms the non-press-fit portion 67 that releases the force generated by the deformation and expansion of the press-fit fixing cylinder 41 which is attributed to the press-fitting of the drive shaft 23, to thereby restrain the generation of a split or crack in the strength-decreased region.

Embodiment 9

A ninth embodiment of the invention will be now described with reference to FIG. 18. The embodiment is characterized in that, in order to release the force generated by the deformation of the press-fit fixing cylinder 41 which is attributed to the press-fitting of the drive shaft 23, a non-press-fit portion 68 comprising a ring-like space surrounding the periphery of the drive shaft 23 is formed on the bearing fixing portion 38 side (opposite side from the distal end of the drive shaft) of the press-fit fixing cylinder 41 in which the drive shaft 23 is press-fitted.

Figure 18:
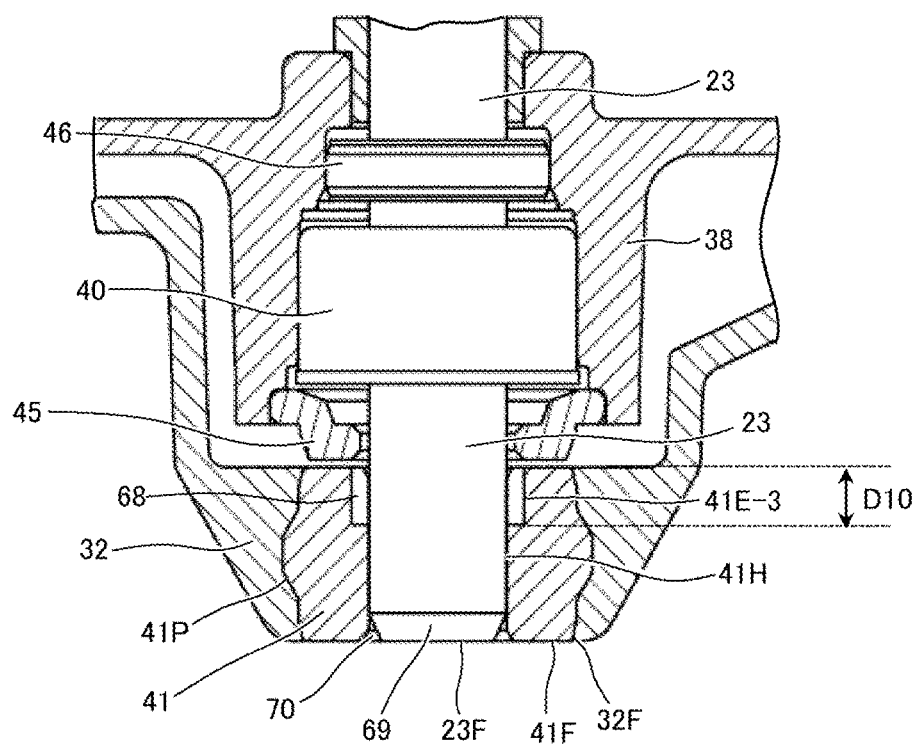
FIG. 18 is a cross-sectional view showing a cross-sectional surface of a main part of a valve body of a flow path switching valve according to a ninth embodiment of the invention.

In FIG. 18, the same reference signs as those in FIG. 10 represent corresponding components which have similar functions to those in FIG. 10. Overlapping descriptions may be omitted.

In FIG. 18, the drive shaft fixing portion 32 having a conical trapezoidal shape is formed in a central portion of the valve main body 14 made of synthetic resin. The press-fit fixing cylinder 41 made of metal is integrally embedded about a central portion of the drive shaft fixing portion 32 by insert-molding. Formed at the outer peripheral portion of the press-fit fixing cylinder 41 is the ring-like projection 41P for retention, which prevents the press-fit fixing cylinder 41 from falling off of the drive shaft fixing portion 32. The distal end surface 32F of the drive shaft fixing portion 32 on the opposite side from the bearing fixing portion 38 and the distal end surface 41F of the press-fit fixing cylinder 41 on the opposite side from the bearing fixing portion 38 have a positional relation of being on the same plane (so-called flush surface).

The drive shaft 23 is press-fitted in and fixed to the press-fit hole 41H of the press-fit fixing cylinder 41 with predetermined interference. A portion of the press-fit hole 41H of the press-fit fixing cylinder 41 which is located on the bearing fixing portion 38 side of the drive shaft 23 is formed as an enlarged hole 41E-3. The enlarged hole 41E-3 forms a ring-like space having predetermined length (D10) between the enlarged hole 41E-3 and the drive shaft 23. The enlarged hole 41E-3 has predetermined diameter. In other words, the diameter of the enlarged hole 41E-3 of the press-fit fixing cylinder 41 is set larger than the diameter of the drive shaft 23, resulting in the formation of the ring-like space having the length (D10). Such a ring-like space is also an example of the predetermined shape.

The ring-like space functions as the aforementioned non-press-fit portion 68 that releases the force generated by the deformation and expansion of the press-fit fixing cylinder 41 which is attributed to the press-fitting of the drive shaft 23, to thereby restrain the generation of a split or crack in the synthetic resin around the press-fit fixing cylinder 41. The non-press-fit portion 64 comprising the ring-like space formed of the enlarged hole 41E-3 is formed in the intermediate area of the drive shaft 23 as described above, to thereby function to release the force generated by the deformation of the press-fit fixing cylinder 41 which is attributed to the press-fitting of the drive shaft 23. The distal end surface 23F of the drive shaft 23 reaches the distal end surface 41F of the press-fit fixing cylinder 41 to come into flush relation with the distal end surface 41F.

In the process of press-fitting the drive shaft 23 into the press-fit hole 41H of the press-fit fixing cylinder 41, the press-fit fixing cylinder 41 is expanded and deformed due to the press-fitting of the drive shaft 23. The deformation of the press-fit fixing cylinder 41 is absorbed by the non-press-fit portion 68 comprising the ring-like space of the press-fit fixing cylinder 41. It is then possible to release the force generated by the deformation of the press-fit fixing cylinder 41 which acts on the synthetic resin of the drive shaft fixing portion 32 which is located around the press-fit fixing cylinder 41. This makes it possible to restrain the generation of a crack or split in the synthetic resin of the drive shaft fixing portion 32 which is located around the outer periphery of the press-fit fixing cylinder 41.

Like the embodiments illustrated in FIGS. 13 and 14, a portion extending to the distal end surface 23F of the drive shaft 23 is a tapered portion 69 with predetermined length which is gradually reduced in diameter. A non-press-fit portion 70 comprising a ring-like space is formed between the tapered portion 69 and the press-fit hole 41H of the press-fit fixing cylinder 41. The non-press-fit portion 70 has a triangular axial cross-section.

The present embodiment also injects synthetic resin using a gate from the opposite side to the distal end surface 32F of the drive shaft fixing portion 32 when insert-molding the press-fit fixing cylinder 41 with the drive shaft fixing portion 32. The strength-decreased region (for example, a welded portion, a void portion, and a gas-deposited portion) is generated on the distal end 32F side of the drive shaft fixing portion 32 and the distal end surface 41F side of the press-fit fixing cylinder 41, and is prone to be split or cracked. To solve this problem, the present embodiment forms the non-press-fit portion 70 that releases the force generated by the deformation and expansion of the press-fit fixing cylinder 41 which is attributed to the press-fitting of the drive shaft 23, to thereby restrain the generation of a split or crack in the strength-decreased region.

Some of the spaces in the predetermined shapes which form the above-mentioned non-press-fit portions are opened to the outside and have a function of accumulating foreign matters contained in fluid. This function makes it possible to restrain the generation of a phenomenon that foreign matters get caught in a seal portion during the rotation of the valve main body.

According to each of the foregoing embodiments, the non-press-fit portion is formed in the drive shaft or the press-fit fixing hole. It is also possible to form non-press-fit portions in both the drive shaft and the press-fit fixing hole. In such a case, any of the first to sixth embodiments may be combined with any of the seventh to ninth embodiments.

As explained above, the invention comprises the valve body that changes a communication state of a flow path through which liquid flows, the valve body comprising a valve main body that is formed of synthetic resin and comprises inside a press-fit fixing cylinder made of metal, and a drive shaft that is press-fitted in and fixed to the press-fit fixing cylinder of the valve main body, wherein a non-press-fit portion comprising a clearance is formed in either one of the press-fit fixing cylinder situated in the radial direction with respect to the axis of the drive shaft and the drive shaft or both the press-fit fixing cylinder and the drive shaft.

The invention makes it possible to provide the valve body in which splitting or cracking is restrained from being generated in synthetic resin that forms a valve main body in the vicinity of a press-fit fixing cylinder in which a drive shaft is press-fitted; a flow path switching valve using the valve body; and a flow path switching valve using the valve body.

The invention is not limited to the embodiments described above, but includes various modification examples.

For example, the embodiments are intended to describe the invention in detail for easy understanding and do not necessarily have to include all the configurations mentioned above. The configuration of each embodiment may be partially replaced with another configuration or incorporated with another configuration. It is also possible to incorporate, omit or replace a part of the configuration of one of the embodiments into, from or with the configuration of another one of the embodiments.

The present application claims priority under Japanese Patent Application No. 2021-146322 filed on Sep. 8, 2021. The entire disclosure of Japanese Patent Application No. 2021-146322 filed on Sep. 8, 2021 including the description, claims, drawings and abstract, is incorporated herein by reference in its entirety.

REFERENCE SIGN LIST

10 Flow path switching valve; 11 Housing body; 12A, 12B, 12C, 12D Connection pipe; 13 Thermostat; 14 Valve main body; 15 Electric motor; 16 Motor housing portion; 17 Cover; 18 Seal member; 19 Compression spring; 20 Outer peripheral portion; 21 Opening portion; 22 Closing wall; 23 Drive shaft; 24 Worm wheel; 25 Worm; 26 Worm wheel; 27 Worm; 28 Valve housing portion; 29 Communication path; 30 Internal path; 31 Open portion; 32 Fixing portion; 33 Flat region portion; 34 Sloping region portion; 35Mi First regulation wall; 35Mx Second regulation wall; 36 Lateral surface wall; 37 End surface wall; 38 Bearing fixing portion; 39Mi First regulation piece; 39Mx Second regulation piece; 40 Slide bearing; 41 Press-fit fixing cylinder; 41H Press-fit hole; 47 Non-press-fit portion; 48 Small diameter portion; 50 Tapered portion; 52 Small diameter portion; 53 Press-fit portion; 49, 51, 54, 60, 62, 64, 65, 68 Non-press-fit portion

The invention claimed is:

1. A valve body that changes a communication state of a flow path through which liquid flows, the valve body comprising:
 a valve main body that is formed of synthetic resin, the valve main body being formed into a shape corresponding to a bottomed cylinder extending in an axial direction, which is closed at one end by a closing wall and opened at the other end by an open portion, the valve main body including an opening portion from which fluid flows out, the opening portion being formed in an outer peripheral portion of the valve main body, a circular drive shaft fixing portion being formed about a center of the closing wall, the drive shaft fixing portion having a distal end surface projecting inside the outer peripheral portion, the valve main body comprising a press-fit fixing cylinder made of metal inside the drive shaft fixing portion; and
 a drive shaft made of metal which is press-fitted in and fixed to a press-fit hole of the press-fit fixing cylinder from an opposite side from the distal end surface of the drive shaft fixing portion,
 wherein the press-fit fixing cylinder made of metal is integrally embedded in the valve main body made of synthetic resin,
 wherein the press-fit fixing cylinder is integrally insert-molded in the drive shaft fixing portion,
 wherein a gate used to inject the synthetic resin at the time of the insert-molding is provided on the opposite side from the distal end surface of the drive shaft fixing portion,
 wherein a press-fit region is formed inside the opposite side from the distal end surface of the drive shaft fixing portion, and the drive shaft is press-fitted in the press-fit hole of the press-fit fixing cylinder in the press-fit region, and
 wherein a non-press-fit portion comprising a space in a predetermined shape is formed in either one of the press-fit fixing cylinder and the drive shaft or both the press-fit fixing cylinder and the drive shaft inside the distal end surface side of the drive shaft fixing portion.

2. The valve body according to claim 1, wherein the drive shaft is formed of stainless material lacking zinc.

3. The valve body according to claim 1, wherein the drive shaft is press-fitted as far as an intermediate point of the press-fit hole of the press-fit fixing cylinder, and the space formed as the non-press-fit portion is formed between a distal end surface of the drive shaft and the press-fit hole of the press-fit fixing cylinder.

4. The valve body according to claim 1, wherein:
 the drive shaft comprises a press-fit region that is press-fitted in the press-fit hole of the press-fit fixing cylinder and a small diameter portion having a smaller diameter than the press-fit region, and
 the space in an annular shape which is formed as the non-press-fit portion is formed between the small diameter portion of the drive shaft and the press-fit hole of the press-fit fixing cylinder.

5. The valve body according to claim 1, wherein:
 the drive shaft comprises a press-fit region that is press-fitted in the press-fit hole of the press-fit fixing cylinder and a tapered portion that is gradually reduced in diameter from the press-fit region toward a distal end side of the drive shaft, and
 the space in an annular shape which is formed as the non-press-fit portion is formed between the tapered portion of the drive shaft and the press-fit hole of the press-fit fixing cylinder.

6. The valve body according to claim 1, wherein the space formed as the non-press-fit portion is formed in an interior portion of the drive shaft on a distal end side of the drive shaft along an axis of the drive shaft.

7. The valve body according to claim 1, wherein the non-press-fit portion comprising an annular space surrounding the drive shaft is formed in the press-fit hole of the press-fit fixing cylinder inside a distal end side of the drive shaft fixing portion.

8. The valve body according to claim 1, wherein the non-press-fit portion is the space that releases deformation of the press-fit fixing cylinder which is caused by the press-fitting of the drive shaft in the press-fit hole inside the distal end side of the drive shaft fixing portion.

9. A flow path switching valve comprising:
 the valve body according to claim 1; and
 a housing including a valve housing portion and a communication path,
 the valve housing portion including a cylindrical lateral surface and containing the valve body rotatably around an axis of the valve body, the cylindrical lateral surface having one end closed by an end surface wall and an opened end at the other end, the end surface wall facing the closing wall of the valve main body,
 the communication path being opened to the valve housing portion and connected to an external auxiliary device,
 wherein a bearing fixing portion is formed about a center of the end surface wall of the housing, the bearing fixing portion axially extending into the valve housing portion and facing the drive shaft fixing portion.

10. A heat medium system for an automobile comprising a fluid pump configured to pressurize and pressure-feed fluid functioning as a heat medium for cooling a heat source, a flow path switching valve configured to send the fluid from the fluid pump to a plurality of auxiliary devices, or a flow path switching valve configured to send fluid from the plurality of auxiliary devices to the fluid pump,
   wherein the flow path switching valve according to claim 9 is used as the flow path switching valve.

11. The heat medium system according to claim 10, wherein:
   the heat source is an internal combustion engine, and the auxiliary devices include at least a radiator, a heating apparatus, and an oil cooler, and
   the flow path switching valve selectively distributes cooling water in the internal combustion engine to the radiator, the heating apparatus, and the oil cooler.

* * * * *